US012682513B2

(12) United States Patent
Akimoto

(10) Patent No.: US 12,682,513 B2
(45) Date of Patent: Jul. 14, 2026

(54) USER INTERFACE SYSTEM, USER INTERFACE METHOD, AND IMAGE EDITING DEVICE

(71) Applicant: SONY GROUP CORPORATION, Tokyo (JP)

(72) Inventor: Naofumi Akimoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 181 days.

(21) Appl. No.: 18/248,752

(22) PCT Filed: Oct. 21, 2021

(86) PCT No.: PCT/JP2021/039018
§ 371 (c)(1),
(2) Date: Apr. 12, 2023

(87) PCT Pub. No.: WO2022/085775
PCT Pub. Date: Apr. 28, 2022

(65) Prior Publication Data
US 2023/0386099 A1 Nov. 30, 2023

Related U.S. Application Data

(60) Provisional application No. 63/104,760, filed on Oct. 23, 2020.

(51) Int. Cl.
*G06T 11/10* (2026.01)
*H04N 9/64* (2023.01)

(52) U.S. Cl.
CPC .............. *G06T 11/10* (2026.01); *H04N 9/64* (2013.01); *G06T 2200/24* (2013.01)

(58) Field of Classification Search
CPC .............. G06T 11/001; G06T 2200/24; G06T 2219/2012; G09G 5/02; G09G 5/028
See application file for complete search history.

(56) References Cited

U.S. PATENT DOCUMENTS

| 8,976,191 | B1 * | 3/2015 | Mendez Mendez .. G06T 19/006 345/589 |
| 2014/0078075 | A1 * | 3/2014 | Wilensky ............ G06F 3/04883 345/173 |

(Continued)

FOREIGN PATENT DOCUMENTS

| JP | 2003-044837 A | 2/2003 |
| JP | 2006-244272 A | 9/2006 |

(Continued)

OTHER PUBLICATIONS

Zhang, et al., "Deep Exemplar-based Video Colorization", Computer Vision and Pattern Recognition, arxiv.org, Jun. 24, 2019, 15 pages.

(Continued)

*Primary Examiner* — Antonio A Caschera
(74) *Attorney, Agent, or Firm* — CHIP LAW GROUP

(57) ABSTRACT

Provided is a user interface system that includes a presentation means that presents information for receiving, from a user, designation related to a target to be subjected to color conversion by image editing for converting a color of an image using instance tracking and pixel tracking, and an acceptance means that receives the designation by the user.

15 Claims, 15 Drawing Sheets

(56) References Cited

U.S. PATENT DOCUMENTS

2016/0180197 A1    6/2016   Kim et al.
2020/0302656 A1 *  9/2020   Kumar ...................... G06T 7/90

FOREIGN PATENT DOCUMENTS

JP       2016-122905  A    7/2016
WO       2017/022641  A1   2/2017

OTHER PUBLICATIONS

Su, et al., "Instance-aware Image Colorization", Computer Vision
and Pattern Recognition, arxiv.org, May 21, 2020, 13 pages.
Vondrick, et al., "Tracking Emerges by Colorizing Videos", Com-
puter Vision and Pattern Recognition, arxiv.org, Jul. 27, 2018, 19
pages.
International Search Report and Written Opinion of PCT Applica-
tion No. PCT/JP2021/039018, issued on Nov. 30, 2021, 10 pages of
ISRWO.

* cited by examiner

FIG.15

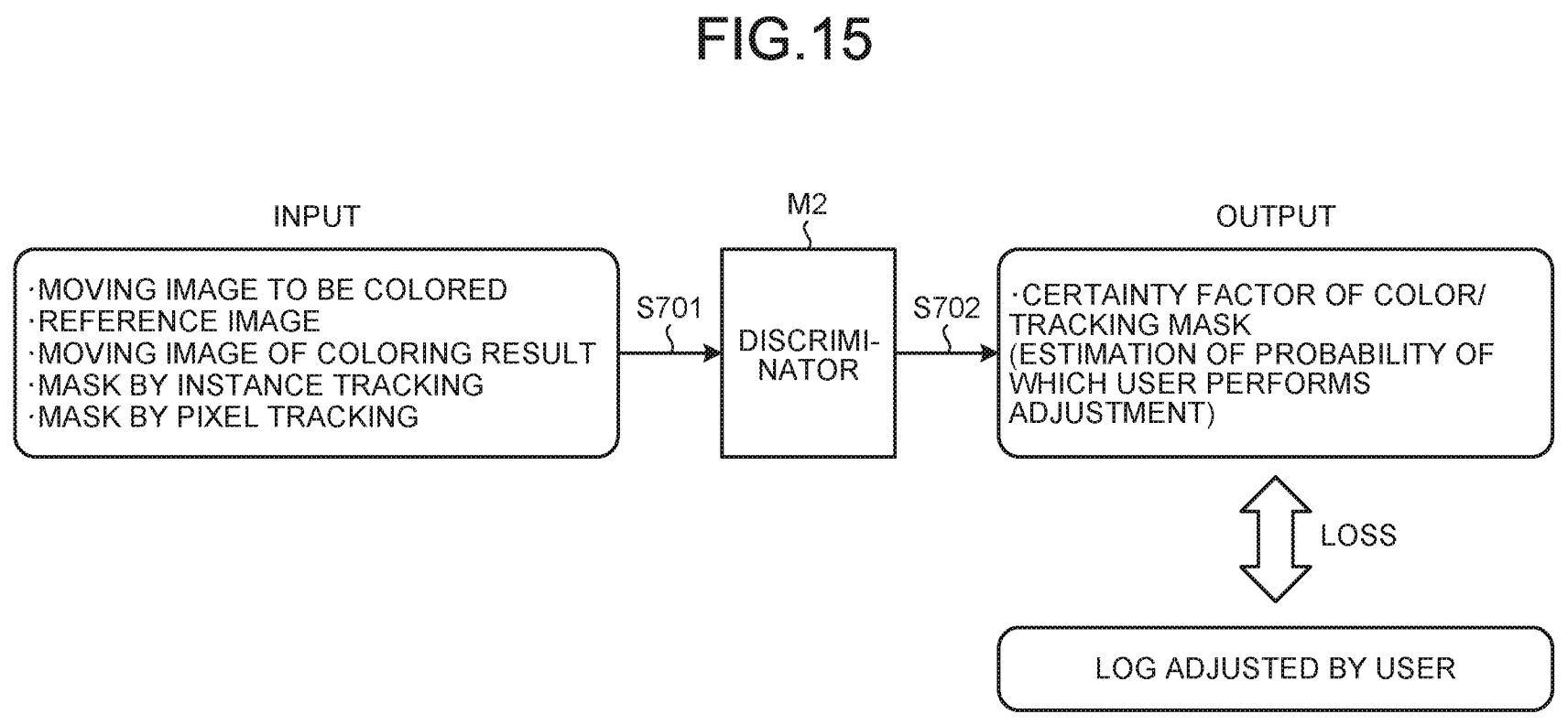

INPUT

- MOVING IMAGE TO BE COLORED
- REFERENCE IMAGE
- MOVING IMAGE OF COLORING RESULT
- MASK BY INSTANCE TRACKING
- MASK BY PIXEL TRACKING

S701

M2

DISCRIMI-NATOR

S702

OUTPUT

- CERTAINTY FACTOR OF COLOR/ TRACKING MASK (ESTIMATION OF PROBABILITY OF WHICH USER PERFORMS ADJUSTMENT)

LOSS

LOG ADJUSTED BY USER

FIG.16

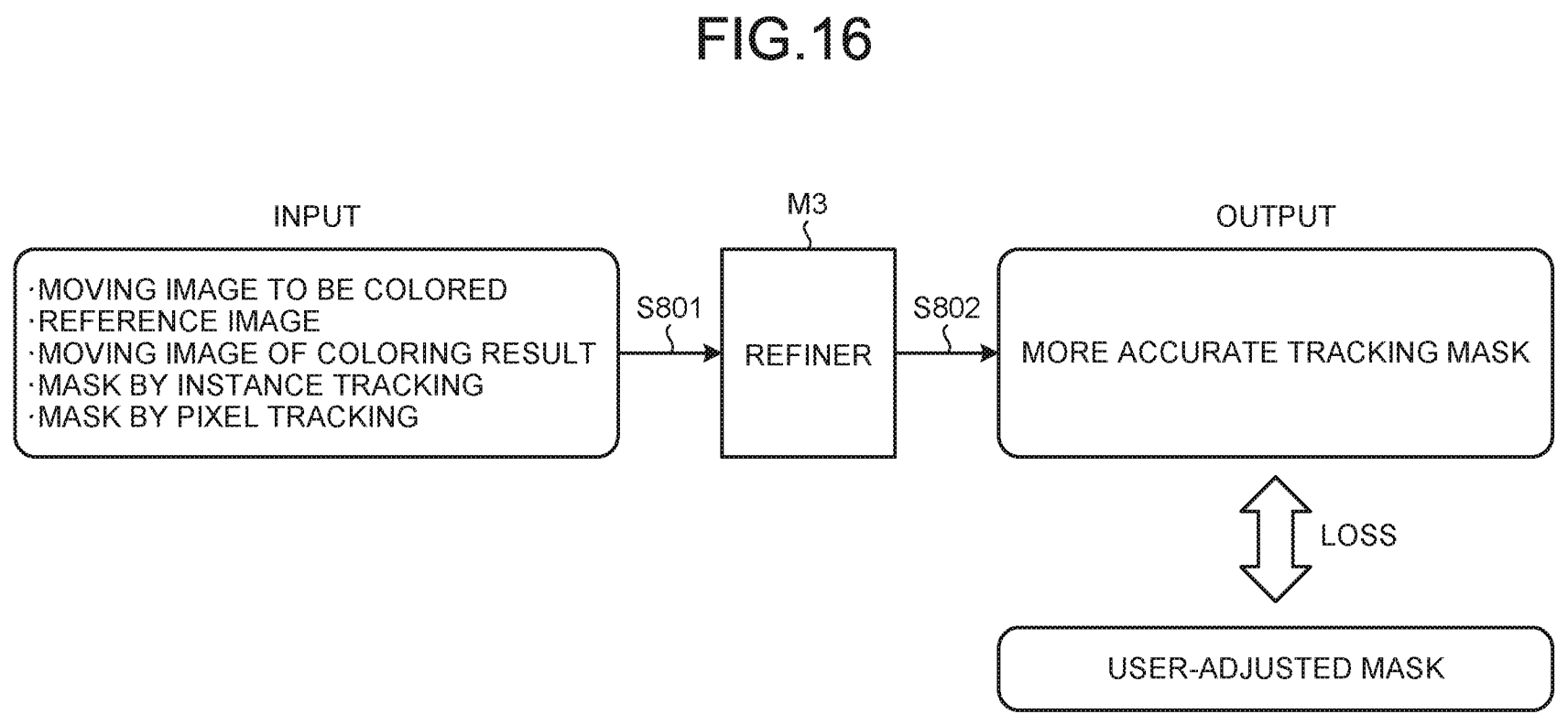

INPUT

- MOVING IMAGE TO BE COLORED
- REFERENCE IMAGE
- MOVING IMAGE OF COLORING RESULT
- MASK BY INSTANCE TRACKING
- MASK BY PIXEL TRACKING

S801

M3

REFINER

S802

OUTPUT

MORE ACCURATE TRACKING MASK

LOSS

USER-ADJUSTED MASK

USER INTERFACE SYSTEM, USER INTERFACE METHOD, AND IMAGE EDITING DEVICE

CROSS REFERENCE TO RELATED APPLICATIONS

This application is a U.S. National Phase of International Patent Application No. PCT/JP2021/039018 filed on Oct. 21, 2021, which claims priority benefit of U.S. Provisional patent Application No. U.S. 63/104,760 filed in the U.S. Patent Office on Oct. 23, 2020. Each of the above-referenced applications is hereby incorporated herein by reference in its entirety.

FIELD

The present disclosure relates to a user interface system, a user interface method, and an image editing device.

BACKGROUND

In the related art, a technique for converting a color of a moving image or the like is known. For example, a technique for automatically coloring a monochrome (black-and-white) video (moving image) is known (for example, Non Patent Literature 1).

CITATION LIST

Non Patent Literature

Non Patent Literature 1: "Deep Exemplar-based Video Colorization", Bo Zhang, Mingming He, Jing Liao, Pedro V. Sander, Lu Yuan, Amine Bermak, Dong Chen <Internet> https://arxiv.org/pdf/1906.09909.pdf (Searched on Oct. 18, 2021)

SUMMARY

Technical Problem

However, there is room for improvement in the related art. For example, in the related art, colorization is realized by an end-to-end network, but usability such as reception of designation by a user is not considered, and there is room for improvement from that viewpoint. Therefore, it is desired to appropriately provide a service related to image editing of color conversion.

Therefore, the present disclosure proposes a user interface system, a user interface method, and an image editing device capable of appropriately providing a service related to image editing of color conversion.

Solution to Problem

According to the present disclosure, a user interface system includes a presentation means that presents information for receiving, from a user, designation related to a target to be subjected to color conversion by image editing for converting a color of an image using instance tracking and pixel tracking, and an acceptance means that receives the designation by the user.

BRIEF DESCRIPTION OF DRAWINGS

FIG. 15 is a diagram illustrating an example of a machine learning model used in the user interface system.

FIG. 16 is a diagram illustrating an example of a machine learning model used in the user interface system.

DESCRIPTION OF EMBODIMENTS

Figure 1:
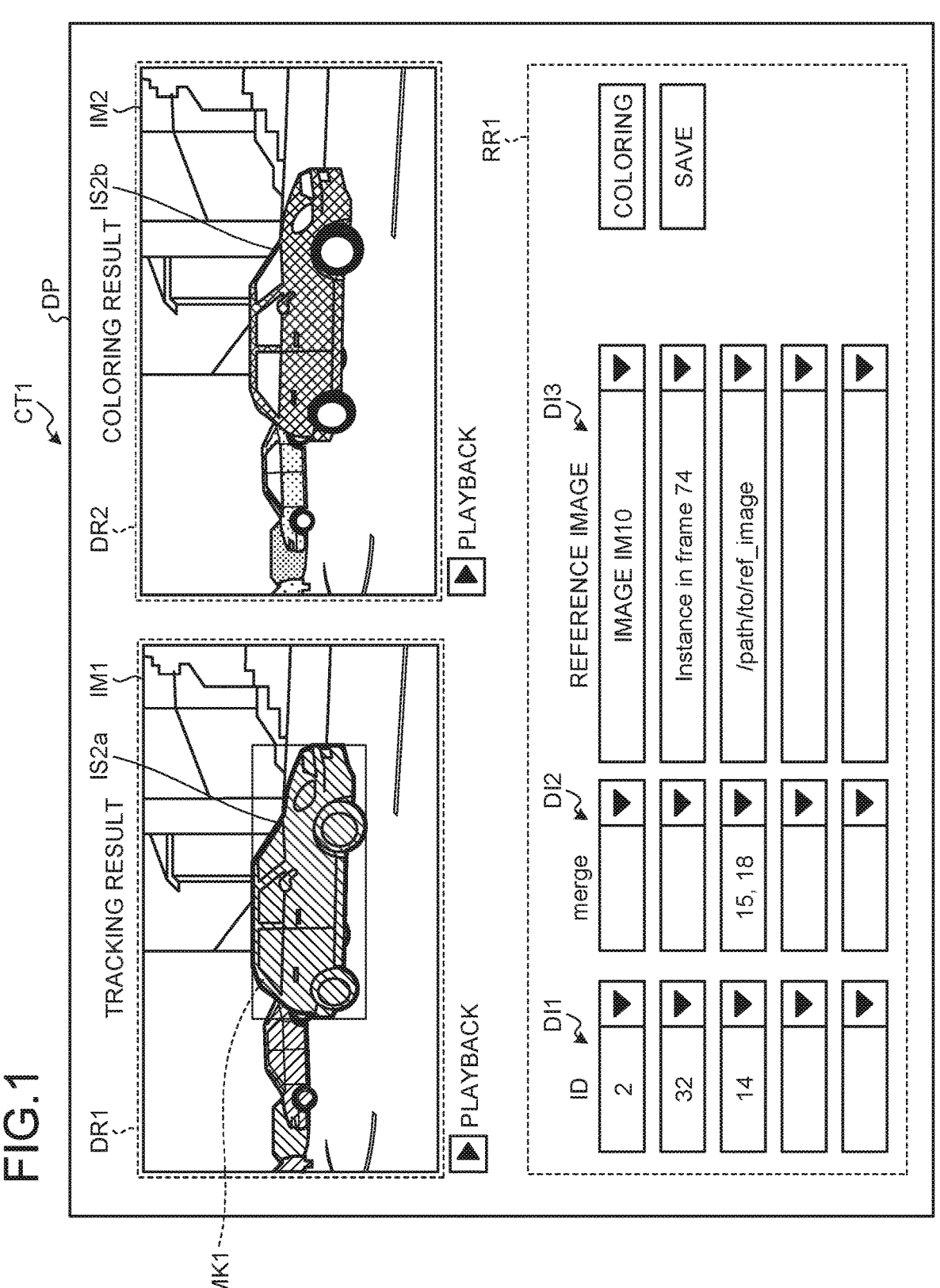
FIG. 1 is a diagram illustrating an example of presentation of information according to an embodiment of the present disclosure.

Hereinafter, the embodiments of the present disclosure will be described in detail with reference to the drawings. Note that the user interface system, the user interface method, and the image editing device according to the present application are not limited by the embodiment. In the following embodiments, the same parts are denoted by the same reference signs, and a duplicate description will be omitted.

The present disclosure will be described in the order of the following items.

1. Embodiment
  1-1. Overview of information processing according to embodiment of present disclosure
  1-2. Configuration of user interface system according to embodiment
  1-3. Configuration of image editing device according to embodiment
  1-4. Configuration of terminal device according to embodiment
  1-5. Procedure of processing related to user interface system according to embodiment
  1-6. Processing example
    1-6-1. Usage example of editing by user
    1-6-2. Instance tracking
    1-6-3. Pixel tracking (dense tracking)
    1-6-4. Image editing processing example 1-7. Model and learning process
    1-7-1. First model (coloring+tracking)
    1-7-2. Second model (discriminator)
    1-7-3. Third model (refiner)
  1-8. Color conversion of color image
2. Other embodiments
  2-1. Other configuration examples
  2-2. Others
3. Effects according to the present disclosure
4. Hardware configuration

1. Embodiment

1-1. Overview of Information Processing According to Embodiment of Present Disclosure The information processing according to the embodiment of the present disclosure is realized by a user interface system 1 (see FIG. 3) including an image editing device 100 (see FIG. 4) and a terminal device 10 (see FIG. 5) which are information processing devices (computers). Although coloring of a monochrome (black-and-white) moving image (video) will be described below as an example of image editing, the image editing may be color conversion of a color image, which will be described later. In the following description, a case where the user interface system 1 performs processing will be described as an example. However, any device included in the user interface system 1, such as the image editing device 100 and the terminal device 10 included in the user interface system 1, may perform the processing as long as the processing is possible.

The user interface system 1 receives designation of a target related to color conversion from a user by using tracking related to an instance (hereinafter, "instance tracking") or tracking related to a pixel (hereinafter, "pixel tracking"). For example, for instance tracking in which an instance (object) is targeted for tracking, the user interface system 1 receives designation of the instance as a target from the user. In addition, for pixel tracking (dense tracking) in which a pixel is targeted for tracking, the user interface system 1 receives, from the user, designation of the pixel as a target. Note that details of instance tracking and pixel tracking (dense tracking) will be described later.

First, an example of information presented to the user in the user interface system 1 will be described with reference to FIG. 1. FIG. 1 is a diagram illustrating an example of presentation of information according to an embodiment of the present disclosure. Specifically, FIG. 1 illustrates a screen DP on which a content CT1 including information related to image editing is displayed. The screen DP in FIG. 1 is, for example, a display unit 13 of the terminal device 10. The user interface system 1 presents various types of information included in the content CT1 to the user when the terminal device 10 displays the content CT1. For example, the content CT1 is generated by the image editing device 100 and provided to the terminal device 10.

Hereinafter, various types of information included in content CT1 will be described. The content CT1 includes a region DR1 and a region DR2 in which a moving image (video) is played back. In a region DR1, a moving image of a tracking result is disposed. The region DR1 of FIG. 1 illustrates a state in which a first image IM1 of the moving image of the tracking result is displayed. When the user selects the playback button disposed below the region DR1, the moving image of the tracking result is played back.

In FIG. 1, a moving image of a tracking result indicates a result of instance tracking, and indicates a state in which a mask MK1 is attached to an instance IS2*a* that is an object (car) in the image IM1. Note that, as in the instance IS2*a*, an instance IS2*b*, and the like, description will be made in a distinguishable manner by adding alphabetic characters such as "a" and "b" to the end, but these are assumed to be instances associated with the same object (car) (collectively referred to as an "instance IS2"). For example, FIG. 1 illustrates a case where the instance IS2 that is a car is a color conversion target.

As described above, in FIG. 1, the user interface system 1 presents the tracking result of the instance tracking by the moving image of the tracking result disposed in the region DR1. In FIG. 1, the moving image of the tracking result is assumed to be a monochrome (black-and-white) moving image (video). That is, in the moving image of the tracking result, the instance IS2 is in a black-and-white state. Note that, although FIG. 1 illustrates an example in which the tracking result of the instance tracking is presented, the user interface system 1 may present the tracking result of the pixel tracking.

In the region DR2, a moving image of the coloring result is disposed. The region DR2 in FIG. 1 illustrates a state in which a first image IM2 of the moving image of the coloring result is displayed. When the user selects the playback button disposed below the region DR2, the moving image of the coloring result is played back. In FIG. 1, the moving image of the coloring result indicates the coloring result, and the instance IS2*b*, which is the object (car) in the image IM2, indicates the instance IS2 in the colored state. The coloring is performed based on the color of the reference image, which will be described later.

As described above, in FIG. 1, the user interface system 1 presents the result of coloring (color conversion) for the instance IS2 by the moving image of the coloring result disposed in the region DR2.

The content CT1 includes a region RR1 in which information for receiving, from the user, designation related to a target to be subjected to color conversion is presented. In the region RR1, a designation portion DI1 for receiving designation of a target to be subjected to color conversion, a designation portion DI3 for receiving designation of a target to be merged, and a designation portion DI3 for receiving a reference image to be used in image editing are disposed.

The user interface system 1 receives selection of an instance as designation of a target to be subjected to color conversion according to an operation of the user on the designation portion DI1. In FIG. 1, the user interface system 1 receives selection of the tracking ID which is the identification information assigned to the instance by the combo box in each field of the designation portion DI1.

The user interface system 1 displays a list of selectable instances when the user performs an operation to select a button disposed at an end of each field of the designation portion DI1. In FIG. 1, a list of tracking IDs such as IDs "2", "32", and "14" is displayed. For example, the ID "2" is a tracking ID assigned to the instance IS2. Note that the display and selection of the list by the combo box are similar to those of the conventional combo box, and thus detailed description is omitted.

The user interface system 1 receives selection of an instance using a list indicating each of a plurality of instances. For example, the user interface system 1 receives selection of the instance IS2 as a target to be subjected to color conversion by the user selecting the ID "2" by an operation of the uppermost column of the designation portion DI1.

The user interface system 1 receives selection of a reference image to be referred to at the time of conversion of a color of the corresponding target according to the user's operation on the designation portion DI3. The user interface system 1 displays a list of selectable reference images when the user performs an operation of selecting a button disposed at an end of each field of the designation portion DI3. This point will be described with reference to FIG. 2.

Figure 2:
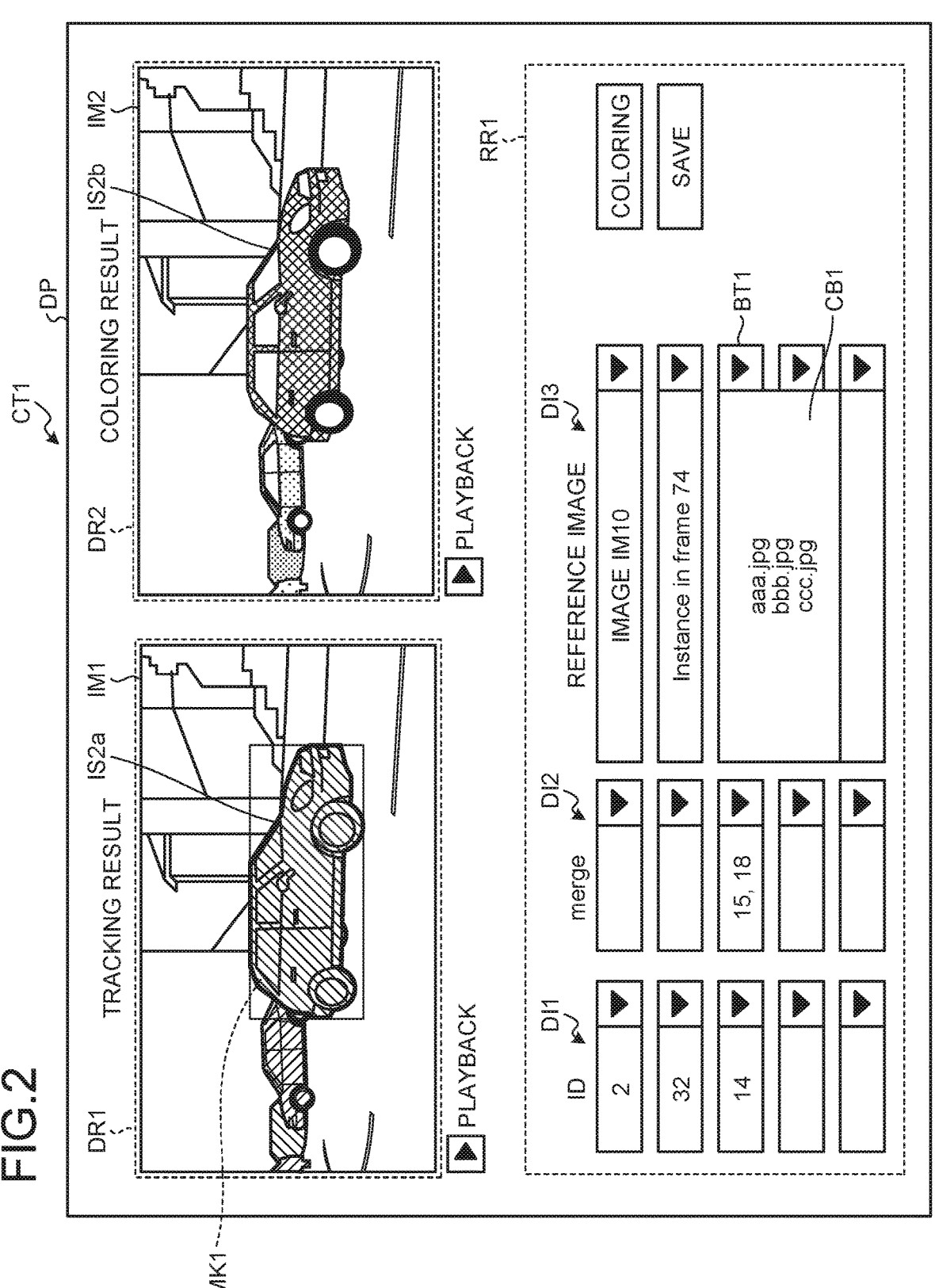
FIG. 2 is a diagram illustrating an example of presentation of information about user designation.

FIG. 2 is a diagram illustrating an example of presentation of information about user designation. Note that, in FIG. 2, the same points as those in FIG. 1 are denoted by the same reference numerals, and the description thereof will be omitted as appropriate. FIG. 2 illustrates a case where the ID "14" is selected in the third row of the designation portion DI1 and the user operates a button BT1 in the third row of the designation portion DI3. For example, the ID "14" is a tracking ID assigned to an instance IS14. That is, FIG. 2 illustrates a scene where the user selects the reference image associated with the instance IS14.

The user interface system 1 displays a list of selectable reference images for the instance IS14 according to the user's operation on the button BT1 in the third row of the designation portion DI3. In FIG. 2, a list CB1 including "aaa.jpg", "bbb.jpg", "ccc.jpg", and the like is displayed as selectable reference images for the instance IS14 in a portion of a column of a third row of the designation portion DI3. Note that FIG. 2 is merely an example, and the user interface system 1 may present an any image to the user as a selectable reference image.

In FIG. 2, IDs "15" and "18" are designated in the column of the third row of a designation portion DI2 corresponding to the third row of the designation portion DI1 in which the ID "14" is selected. That is, FIG. 2 illustrates a state in which the user has made designation to merge the instance identified by the ID "14" with the instance identified by the ID "15" and the instance identified by the ID "18". In this case, in the user interface system 1, the user merges the instance identified by the ID "14", the instance identified by the ID "15", and the instance identified by the ID "18" into one instance.

Returning to FIG. 1, the description will be continued. FIG. 1 illustrates a case where an image IM10 is selected as the reference image corresponding to the ID "2". That is, the user inputs the image IM10 to the uppermost column of the designation portion DI3 corresponding to the uppermost column of the designation portion DI1 in which the ID "2" is selected, thereby designating the image IM10 as the reference image for the instance (instance IS2) identified by the ID "2". As a result, the user interface system 1 receives selection of the image IM10 as a reference image for the instance (instance IS2) identified by the ID "2".

When the user selects the button labeled with "coloring", the user interface system 1 performs the image editing processing of performing coloring based on the information designated by the user in the region RR1. In this case, for example, the user interface system 1 performs the image editing processing of coloring the instance IS2 using the image IM10 as a reference image for the instance (instance IS2) identified by the ID "2". When the user selects the button labeled with "save", the user interface system 1 performs processing of saving the coloring result in the storage device (for example, a storage unit 14 or a storage unit 120, etc.). When the user selects the button labeled with "save", the user interface system 1 may save the information designated by the user in the region RR1 in the storage device (for example, the storage unit 14 or the storage unit 120, etc.).

As described above, the user interface system 1 presents the information for receiving, from the user, the designation related to the target to be subjected to color conversion, and receives the designation by the user. Therefore, the user interface system 1 can appropriately provide a service related to image editing of color conversion. Note that, in FIG. 1, selection of a reference image is received corresponding to each ID. That is, the user interface system 1 receives a reference image used in image editing for each instance selected by the user. As a result, the user interface system 1 performs image editing using a different reference image for each instance.

1-2. Configuration of User Interface System According to Embodiment

Figure 3:
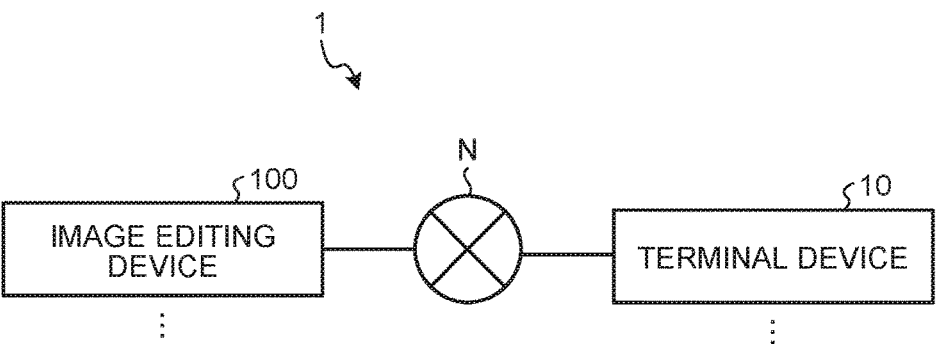
FIG. 3 is a diagram illustrating a configuration example of a user interface system according to an embodiment of the present disclosure.

The user interface system 1 illustrated in FIG. 3 will be described. As illustrated in FIG. 3, the user interface system 1 includes the terminal device 10 and the image editing device 100. The terminal device 10 and the image editing device 100 are communicably connected in a wired or wireless manner via a predetermined communication network (network N). FIG. 3 is a diagram illustrating a configuration example of the user interface system according to the embodiment. Note that the user interface system 1 illustrated in FIG. 3 may include a plurality of terminal devices 10 and a plurality of image editing devices 100.

The image editing device 100 is a computer that performs the image editing processing. For example, the image editing device 100 executes color conversion by image editing for converting a color of an image using instance tracking and pixel tracking. The image editing device 100 performs the image editing processing in accordance with designation by the user.

The terminal device 10 is a computer used by a user. For example, the terminal device 10 receives an operation by the user of designating a target. The terminal device 10 transmits information indicating a target designated by the user to the image editing device 100. Furthermore, the terminal device 10 may receive user designation by voice.

The terminal device 10 is a device apparatus used by a user. The terminal device 10 receives an input by the user. The terminal device 10 receives a voice input by the user's utterance or an input by the user's operation. The terminal device 10 displays information according to the input of the user. The terminal device 10 may be any device as long as the processing in the embodiment can be realized. For example, the terminal device 10 may be a device such as a smartphone, a smart speaker, a television, a tablet terminal, a notebook personal computer (PC), a desktop PC, a cellular phone, or a personal digital assistant (PDA).

1-3. Configuration of Image Editing Device According to Embodiment

Figure 4:
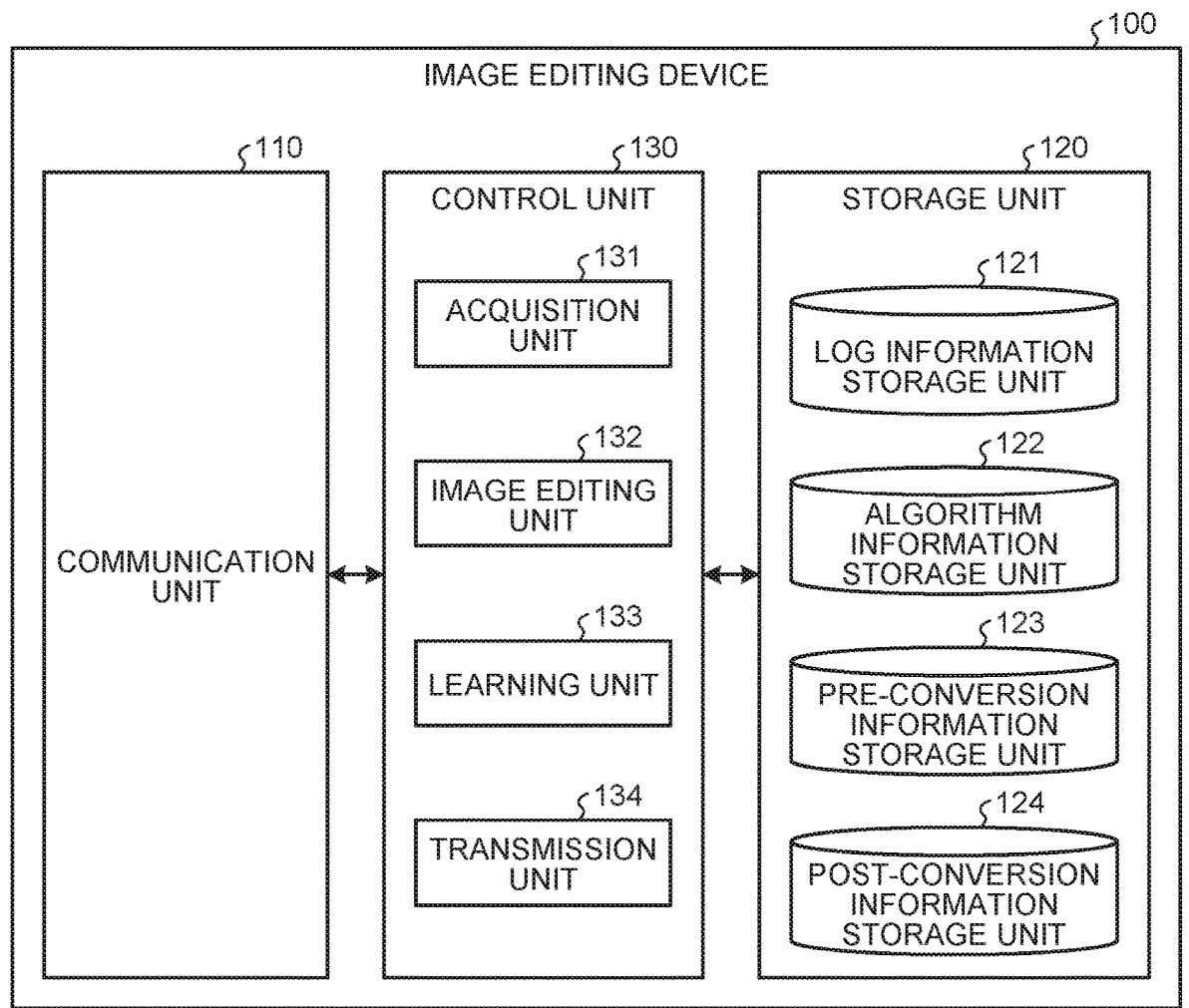
FIG. 4 is a diagram illustrating a configuration example of an image editing device according to an embodiment of the present disclosure.

Next, a configuration of the image editing device 100, which is an example of an information processing device that executes information processing according to the embodiment, will be described. FIG. 4 is a diagram illustrating a configuration example of an image editing device according to an embodiment of the present disclosure.

As illustrated in FIG. 4, the image editing device 100 includes a communication unit 110, the storage unit 120, and a control unit 130. Note that the image editing device 100 may include an input unit (for example, a keyboard, a mouse, or the like) that receives various operations from an administrator or the like of the image editing device 100, and a display unit (for example, a liquid crystal display or the like) for displaying various types of information.

The communication unit 110 is realized by, for example, a network interface card (NIC) or the like. Then, the communication unit 110 is connected to the network N (see FIG. 3) in a wired or wireless manner to transmit and receive information to and from another information processing device such as the terminal device 10.

For example, the storage unit 120 is realized by a semiconductor memory device such as a random access memory (RAM) and a flash memory, or a storage device such as a hard disk and an optical disk. As illustrated in FIG. 4, the storage unit 120 according to the embodiment includes a log information storage unit 121, an algorithm information storage unit 122, a pre-conversion information storage unit 123, and a post-conversion information storage unit 124.

The storage unit 120 stores various types of information in addition to the above. The storage unit 120 stores various types of information about contents displayed on the terminal device 10. For example, the storage unit 120 stores information about contents displayed by an application (also referred to as an "appli") installed in the terminal device 10.

The log information storage unit 121 according to the embodiment stores log information related to image editing. The log information storage unit 121 stores log information related to the user's operation. For example, the log information storage unit 121 stores a history of the user's correction of a result of image editing performed in the past. The log information storage unit 121 stores a history of the user's correction of the image editing result as learning data used for learning of a machine learning model (hereinafter also simply referred to as a "model"). Note that the log information storage unit 121 is not limited to the above, and may store various types of information depending on the purpose.

The algorithm information storage unit 122 according to the embodiment stores various types of information about an algorithm used for image editing. The algorithm information storage unit 122 stores various types of information related to an algorithm of the tracking process. The algorithm information storage unit 122 stores various types of information about instance tracking. The algorithm information storage unit 122 stores various types of information about pixel tracking. The algorithm information storage unit 122 stores various types of information related to the algorithm of the coloring process.

The algorithm information storage unit 122 stores various types of information related to a model used for image editing. The algorithm information storage unit 122 stores various types of information about the model related to the tracking process. For example, the algorithm information storage unit 122 stores various types of information about a model related to instance tracking. For example, the algorithm information storage unit 122 stores various types of information about a model related to pixel tracking. The algorithm information storage unit 122 stores various types of information related to the model related to the coloring process.

The algorithm information storage unit 122 stores various machine learning models (models) such as models M1 to M3. For example, the algorithm information storage unit 122 stores, for the models M1 to M3 and the like, various types of information constituting the models, such as information and functions regarding the network. Each of the models M1 to M3 and the like may be a model (network) in the form of a neural network (NN) such as a deep neural network (DNN). Each of the models M1 to M3 and the like may be a model in a format such as a recurrent neural network (RNN) or a long short-term memory unit (LSTM) obtained by extending the RNN. Furthermore, the model may be a model in a format such as a convolutional neural network (CNN). Note that the model is not limited to the neural network, and may be a regression model such as a support vector machine (SVM) or a model (function) of various forms depending on the purpose and use. The algorithm information storage unit 122 is not limited to store the above, and may store various types of information depending on the purpose.

The pre-conversion information storage unit 123 according to the embodiment stores various types of information about the moving image before color conversion by image editing. The pre-conversion information storage unit 123 stores a moving image to be subjected to image editing. The pre-conversion information storage unit 123 stores information (moving image ID or the like) for identifying the converted moving image in association with each moving image. Note that the pre-conversion information storage unit 123 is not limited to store the above, and may store various types of information depending on the purpose.

The post-conversion information storage unit 124 according to the embodiment stores various types of information about the moving image after color conversion by image editing. The post-conversion information storage unit 124 stores information (moving image ID or the like) for identifying the moving image before conversion in association with each moving image. The post-conversion information storage unit 124 stores the moving image of the tracking result. The post-conversion information storage unit 124 stores a moving image of the coloring result. Note that the post-conversion information storage unit 124 is not limited to store the above, and may store various types of information depending on the purpose.

Returning to FIG. 4, the description will be continued. The control unit 130 is implemented by, for example, a central processing unit (CPU), a micro processing unit (MPU), or the like executing a program (for example, an information processing program or the like according to the present disclosure) stored inside the image editing device 100 using a random access memory (RAM) or the like as a work area. Furthermore, the control unit 130 is realized by, for example, an integrated circuit such as an application specific integrated circuit (ASIC) or a field programmable gate array (FPGA).

As illustrated in FIG. 4, the control unit 130 includes an acquisition unit 131, an image editing unit 132, a learning unit 133, and a transmission unit 134, and implements or executes a function and an action of information processing described below. Note that the internal configuration of the control unit 130 is not limited to the configuration illustrated in FIG. 4, and may be another configuration as long as information processing to be described later is performed. Furthermore, the connection relationship between the processing units included in the control unit 130 is not limited to the connection relationship illustrated in FIG. 4, and may be another connection relationship.

The acquisition unit 131 acquires various types of information. The acquisition unit 131 acquires various types of information from the storage unit 120. The acquisition unit 131 acquires various types of information from an external information processing device such as the terminal device 10. The acquisition unit 131 acquires various types of information from the terminal device 10 with respect to information input to the terminal device 10. The acquisition unit 131 receives information about the operation of the terminal device 10 by the user from the terminal device 10. The acquisition unit 131 receives information indicating designation by the user from the terminal device 10.

The image editing unit 132 performs processing related to image editing. The image editing unit 132 performs processing related to image editing based on various algorithms. The image editing unit 132 performs processing related to image editing by using the model learned by the learning unit 133. The image editing unit 132 performs processing related to image editing using various machine learning models such as the models M1 to M3. For example, the image editing unit 132 performs the image editing processing of converting the color of the instance (target) in the image using the model M1 for performing tracking and coloring. The image editing unit 132 performs image editing for converting the color of the image using instance tracking.

The image editing unit 132 performs image editing for converting the color of the image using pixel tracking. For example, the image editing unit 132 tracks each pixel and identifies a temporally related region for each pixel in order to color all pixels of the target frame (target image). The image editing unit 132 performs image editing for performing color conversion on a target to be subjected to color conversion based on user designation. The image editing unit 132 performs image editing that is coloring of the black-and-white image. The image editing unit 132 performs image editing that is color conversion of a color image. The image editing unit 132 performs image editing on the instance selected by the user as a target. The image editing unit 132 performs image editing based on the pixel performed by the user. The image editing unit 132 generates a result of image editing. The image editing unit 132 generates an image after color conversion by image editing. The image editing unit 132 generates information indicating a certainty factor related to color conversion by image editing. The image editing unit 132 generates information suggesting adjustment by the user based on the certainty factor.

The image editing unit 132 performs image editing based on the designation by the user. The image editing unit 132 performs image editing using the reference image designated by the user. The image editing unit 132 performs image editing on the instance, as a target, associated with the identification information selected by the user. The image editing unit 132 performs image editing on the instance, as a target, associated with the tracking ID selected by the user. The image editing unit 132 performs image editing using the reference image selected by the user. The image editing unit 132 performs image editing using the reference image selected by the user for each instance used in image editing. The image editing unit 132 performs image editing based on correction by the user on the result of image editing.

For example, the image editing unit 132 propagates a mask (for example, an instance mask) for expressing the correspondence relationship in the time direction. For example, the image editing unit 132 determines the instance from the region limited by the mask of the reference image. The image editing unit 132 obtains the correspondence relationship between the reference frame and the target frame in the time direction by tracking. The image editing unit 132 identifies which instance of the frame of the reference image is the instance in the target frame from the time-series relationship between the frames, and warps the color using the tracking result. The image editing unit 132 more finely limits the warp source (reference source) of the color by identifying a region on the reference frame temporally related to the pixel on the target frame to be colored.

For example, in the color warping, the image editing unit 132 extracts feature amounts (semantic features) by passing the reference frame and the target frame through a network, and calculates similarity therebetween. Furthermore, the image editing unit 132 warps the color only in the region identified by tracking. The image editing unit 132 improves recovery of a miss in color warping and temporal coherence in adjacent frames by refine processing.

The image editing unit 132 generates various types of information such as a screen (content) to be provided to an external information processing device by appropriately using various technologies. The image editing unit 132 generates a screen (content) or the like to be provided to the terminal device 10. For example, the image editing unit 132 generates a screen (content) or the like to be provided to the terminal device 10 based on the information stored in the storage unit 120. The image editing unit 132 generates each content such as the content CT1. The image editing unit 132 may generate a screen (content) or the like by any processing as long as the screen (content) or the like to be provided to the external information processing device can be generated. For example, the image editing unit 132 generates a screen (content) to be provided to the terminal device 10 by appropriately using various technologies related to image generation, image processing, and the like. For example, the image editing unit 132 generates a screen (content) to be provided to the terminal device 10 by appropriately using various technologies such as Java (registered trademark). Note that the image editing unit 132 may generate a screen (content) to be provided to the terminal device 10 based on a format such as CSS, JavaScript (registered trademark), or HTML. Furthermore, for example, the image editing unit 132 may generate a screen (content) in various formats such as a joint photographic experts group (JPEG), a graphics interchange format (GIF), and portable network graphics (PNG).

The learning unit 133 learns various types of information. The learning unit 133 learns various types of information based on information from an external information processing device or information stored in the storage unit 120. The learning unit 133 learns various types of information based on the information stored in the log information storage unit 121. The learning unit 133 stores the model generated by learning in the algorithm information storage unit 122. The learning unit 133 stores the model updated by learning in the algorithm information storage unit 122.

The learning unit 133 performs learning processing. The learning unit 133 performs various kinds of learning. The learning unit 133 learns various types of information based on the information acquired by the acquisition unit 131. The learning unit 133 learns (generates) the model. The learning unit 133 learns various types of information such as a model. The learning unit 133 generates a model by learning. The learning unit 133 learns the model using various techniques related to machine learning. For example, the learning unit 133 learns parameters of a model (network). The learning unit 133 learns the model using various techniques related to machine learning.

The learning unit 133 generates a model used for image editing processing. The learning unit 133 generates various machine learning models such as the models M1 to M3. The learning unit 133 learns parameters of the network. For example, the learning unit 133 learns parameters of the network of the model M1. In addition, the learning unit 133 learns parameters of the network of the model M2. In addition, the learning unit 133 learns parameters of the network of the model M3.

The learning unit 133 learns the model by machine learning using the information about correction by the user. The learning unit 133 performs learning processing using the log data stored in the log information storage unit 121 as learning data (teacher data). The learning unit 133 generates a machine learning model by performing learning processing using the log data stored in the log information storage unit 121 as learning data. The learning unit 133 generates a model by learning parameters of the network of the model.

The method of learning by the learning unit 133 is not particularly limited, but for example, learning data in which a label and data (image) are associated with each other may be prepared, and the learning data may be input to a calculation model based on a multilayer neural network to perform learning. The learning unit 133 may use a method based on a recursive neural network or an LSTM obtained by extending an RNN. Furthermore, for example, another method such as CNN may be used.

The transmission unit 134 functions as a presentation unit that presents information to the user. The transmission unit 134 transmits various types of information. The transmission unit 134 transmits various types of information to an external information processing device. The transmission unit 134 provides various types of information to an external information processing device. For example, the transmission unit 134 transmits various types of information to another information processing device such as the terminal device 10. The transmission unit 134 provides the information stored in the storage unit 120. The transmission unit 134 transmits the information stored in the storage unit 120.

The transmission unit 134 provides various types of information based on information from another information processing device such as the terminal device 10. The transmission unit 134 provides various types of information based on the information stored in the storage unit 120.

The transmission unit 134 transmits the information generated by the image editing unit 132. The transmission unit 134 transmits the information for display to the terminal device 10. The transmission unit 134 transmits the content to the terminal device 10.

The transmission unit 134 transmits information for receiving, from the user, designation related to a target to be subjected to color conversion by image editing for converting a color of an image using instance tracking and pixel tracking. The transmission unit 134 transmits information for receiving, from the user, designation related to a target to be subjected to color conversion by image editing using a model learned by machine learning. The transmission unit 134 transmits information for receiving designation related to a target to be subjected to color conversion by image editing that is coloring of a black-and-white image or color conversion of a color image.

The transmission unit 134 transmits information for receiving, from the user, selection of an instance as designation. The transmission unit 134 transmits one image for receiving pixel designation. The transmission unit 134 transmits the result of color conversion by image editing. The transmission unit 134 transmits the image after the color conversion as a result of the image editing. The transmission unit 134 transmits information indicating a certainty factor related to color conversion by image editing. The transmission unit 134 transmits information suggesting adjustment by the user based on the certainty factor.

1-4. Configuration of Terminal Device According to Embodiment

Figure 5:
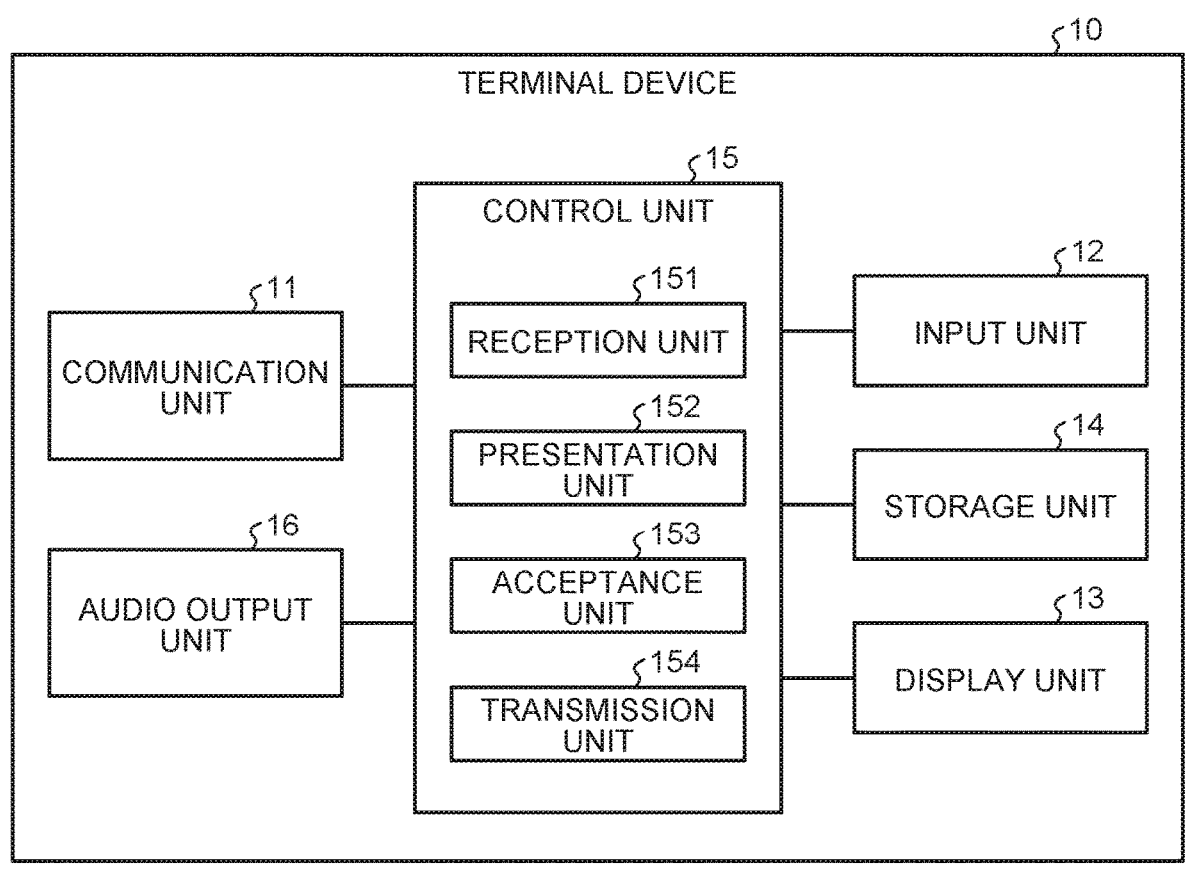
FIG. 5 is a diagram illustrating a configuration example of a terminal device according to an embodiment of the present disclosure.

Next, a configuration of the terminal device 10 which is an example of an information processing device that executes information processing according to the embodiment will be described. FIG. 5 is a diagram illustrating a configuration example of the terminal device according to the embodiment of the present disclosure.

As illustrated in FIG. 5, the terminal device 10 includes a communication unit 11, an input unit 12, the display unit 13, the storage unit 14, a control unit 15, and an audio output unit 16.

The communication unit 11 is realized by, for example, an NIC, a communication circuit, or the like. Then, the communication unit 11 is connected to a predetermined communication network (network) in a wired or wireless manner to transmit and receive information to and from an external information processing device. For example, the communication unit 11 is connected to a predetermined communication network in a wired or wireless manner to transmit and receive information to and from the image editing device 100.

The input unit 12 receives inputs by various operations by the user. For example, the input unit 12 may receive various operations from a user such as an operator via a display face (for example, the display unit 13) by a touch panel function. In this case, the input unit 12 and an acceptance unit 153 may be integrated. Furthermore, the input unit 12 may receive various operations from a button provided on the terminal device 10 or a keyboard or a mouse connected to the terminal device 10. The input unit 12 may receive a user's input by voice via a microphone or the like. The input unit 12 receives various operations by the user's utterance.

The display unit 13 displays information. The display unit 13 displays information according to control by a presentation unit 152. The display unit 13 is a display screen of a tablet terminal or the like realized by, for example, a liquid crystal display, an organic electro-luminescence (EL) display, or the like, and is a display device that displays various types of information.

The display unit 13 displays an application that presents various types of information provided from the image editing device 100. The display unit 13 displays contents. The display unit 13 displays various types of information received from the image editing device 100. The display unit 13 displays the content CT1 from the image editing device 100.

For example, the storage unit 14 is realized by a semiconductor memory device such as a random access memory (RAM) and a flash memory, or a storage device such as a hard disk and an optical disk. The storage unit 14 stores, for example, various types of information received from the image editing device 100. The storage unit 14 stores, for example, information about an application (for example, an information output application or the like) installed in the terminal device for example, a program or the like. The storage unit 14 stores information about various applications (programs) that realize display of various types of information such as the content CT1.

The control unit 15 is a controller, and is implemented by, for example, a CPU, an MPU, or the like executing various programs stored in a storage device such as the storage unit 14 inside the terminal device 10 using a RAM as a work area. For example, the various programs include programs of an application (for example, an information output application) that performs information processing. Furthermore, the control unit 15 is a controller, and is realized by, for example, an integrated circuit such as an ASIC or an FPGA.

As illustrated in FIG. 5, the control unit 15 includes a reception unit 151, the presentation unit 152, the acceptance unit 153, and a transmission unit 154, and realizes or executes a function and an action of information processing described below. Note that the internal configuration of the control unit is not limited to the configuration illustrated in FIG. 5, and may be another configuration as long as information processing to be described later is performed. Furthermore, the connection relationship between the processing units included in the control unit 15 is not limited to the connection relationship illustrated in FIG. 5, and may be another connection relationship.

The reception unit 151 receives information from the image editing device 100 via the communication unit 11. The reception unit 151 receives information provided by the image editing device 100. The reception unit 151 receives contents from the image editing device 100. The reception unit 151 receives the content CT1. For example, the reception unit 151 acquires various types of information from an external information processing device. For example, the reception unit 151 stores the acquired various types of information in the storage unit 14. The reception unit 151 acquires information. The reception unit 151 acquires input information (selection information) indicating selection by the user received by the input unit 12.

The reception unit 151 receives information for receiving, from the user, designation related to a target to be subjected to color conversion by image editing for converting a color of an image using instance tracking and pixel tracking. The reception unit 151 receives information for receiving, from the user, designation related to a target to be subjected to color conversion by image editing using a model learned by machine learning. The reception unit 151 receives information for receiving designation related to a target to be subjected to color conversion by image editing that is coloring of a black-and-white image or color conversion of a color image.

The reception unit 151 receives information for receiving, from the user, selection of an instance as designation. The reception unit 151 receives one image for receiving designation of a pixel. The reception unit 151 receives a result of color conversion by image editing. The reception unit 151 receives the image after the color conversion as a result of the image editing. The reception unit 151 receives information indicating a certainty factor related to color conversion by image editing. The reception unit 151 receives information suggesting adjustment by the user based on the certainty factor.

The presentation unit 152 executes presentation processing of presenting information to the user. The presentation unit 152 presents information to the user by displaying various types of information via the display unit 13. For example, the presentation unit 152 controls display on the display unit 13. The presentation unit 152 presents information to the user by audio-outputting various types of information via the audio output unit 16. For example, the presentation unit 152 controls audio output of the audio output unit 16.

The presentation unit 152 outputs the information received by the reception unit 151. The presentation unit 152 outputs the content provided from the image editing device 100. The presentation unit 152 causes the display unit 13 to display the content received by the reception unit 151, or causes the audio output unit 16 to output the content by voice. The presentation unit 152 displays the content via the display unit 13. The presentation unit 152 audio-outputs the content via the audio output unit 16. The presentation unit 152 may acquire various types of information stored in the storage unit 14 and execute presentation processing using the acquired information. The presentation unit 152 presents various types of information included in the content CT1. The presentation unit 152 presents various types of information included in the content CT1 by displaying the content CT1 on the display unit 13.

The presentation unit 152 presents information for receiving, from the user, designation related to a target to be subjected to color conversion by image editing for converting the color of the image using instance tracking and pixel tracking. The presentation unit 152 presents information for receiving, from the user, designation related to a target to be subjected to color conversion by image editing using a model learned by machine learning. The presentation unit 152 presents information for receiving designation related to a target to be subjected to color conversion by image editing that is coloring of a black-and-white image or color conversion of a color image.

The presentation unit 152 presents information for receiving, from the user, selection of an instance as designation. The presentation unit 152 presents one image for receiving pixel designation. The presentation unit 152 presents a result of color conversion by image editing. The presentation unit 152 presents the image after the color conversion as a result of the image editing. The presentation unit 152 presents information indicating a certainty factor related to color conversion by image editing. The presentation unit 152 presents information that proposes adjustment by the user based on the certainty factor.

The acceptance unit 153 receives various types of information. For example, the acceptance unit 153 receives an input by the user via the input unit 12. The acceptance unit 153 receives an operation by the user. The acceptance unit 153 receives the user's selection for the information displayed by the display unit 13. The acceptance unit 153 may receive an utterance by the user as an input.

The acceptance unit 153 receives designation by the user. The acceptance unit 153 receives a reference image used for image editing from the user. The acceptance unit 153 receives selection of an instance by the user. The acceptance unit 153 receives selection of identification information for identifying an instance.

The acceptance unit 153 receives selection of a tracking ID that is identification information assigned to an instance tracked by instance tracking. The acceptance unit 153 receives selection of an instance using a list showing each of a plurality of instances. The acceptance unit 153 receives selection of a reference image to be used in color conversion for an instance.

The acceptance unit 153 receives a reference image to be used in image editing for each instance selected by the user. The acceptance unit 153 receives selection of a pixel for one image by the user. The acceptance unit 153 receives user's selection of a range of one image. The acceptance unit 153 receives the user's correction of the image editing result.

The transmission unit 154 transmits various types of information to an external information processing device via the communication unit 11. The transmission unit 154 transmits various types of information to the image editing device 100. The transmission unit 154 transmits various types of information stored in the storage unit 14 to an external information processing device. The transmission unit 154 transmits the information received by the acceptance unit 153 to the image editing device 100.

The transmission unit 154 transmits the information about the user's operation received by the acceptance unit 153 to the image editing device 100. The transmission unit 154 transmits the input information (user selection information) received by the acceptance unit 153 to the image editing device 100. The transmission unit 154 transmits, to the image editing device 100, the information indicating the target designated by the user and received by the acceptance unit 153.

Note that each processing by the control unit 15 described above may be realized by, for example, JavaScript (registered trademark) or the like. Furthermore, in a case where the processing such as information processing by the control unit 15 described above is performed by a predetermined application, each unit of the control unit 15 may be realized by, for example, a predetermined application. For example, processing such as information processing by the control unit 15 may be realized by control information received from an external information processing device. For example, in a case where the above-described display processing is performed by a predetermined application (for example, an information output application or the like), the control unit 15 may include, for example, an application control unit that controls the predetermined application or the dedicated application.

The audio output unit 16 is realized by a speaker that outputs a voice, and is an output device for outputting various types of information as a voice. The audio output unit 16 audio-outputs the content provided from the image editing device 100. For example, the audio output unit 16 outputs a voice corresponding to the information displayed on the display unit 13.

1-5. Procedure of Processing Related to User Interface System According to Embodiment Next, a procedure of various types of information processing according to the embodiment will be described with reference to FIGS. 6 and 7.

Figure 6:
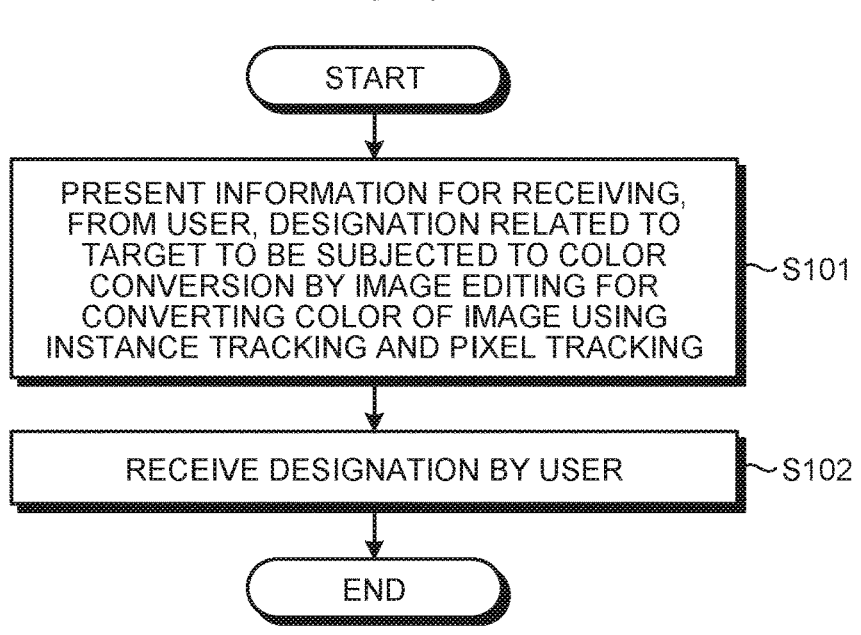
FIG. 6 is a flowchart illustrating a processing procedure of the user interface system according to the embodiment of the present disclosure.

First, a flow of processing according to the image editing device according to the embodiment of the present disclosure will be described with reference to FIG. 6. FIG. 6 is a flowchart illustrating a processing procedure of the user interface system according to the embodiment of the present disclosure.

As illustrated in FIG. 6, the user interface system 1 presents information for receiving, from the user, designation of a target to be subjected to color conversion by image editing for converting a color of an image using instance tracking and pixel tracking (step S101). Then, the user interface system 1 receives designation by the user (step S102).

Figure 7:
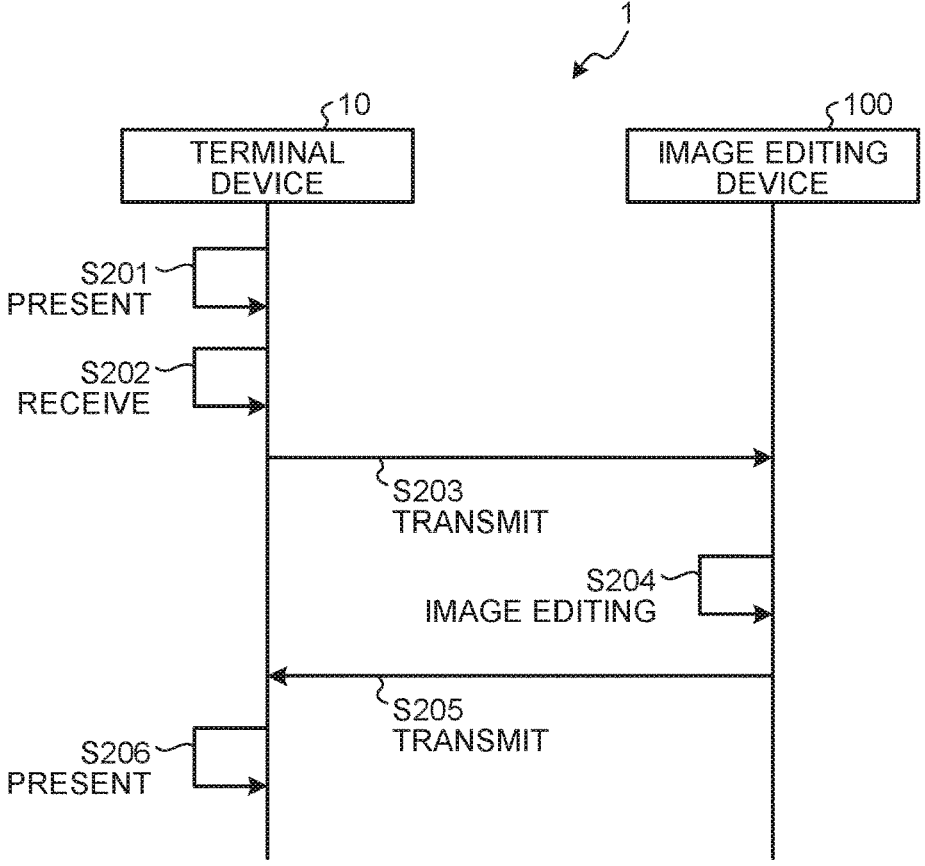
FIG. 7 is a sequence diagram illustrating a processing procedure of the user interface system according to the embodiment of the present disclosure.

Next, a flow of processing in each device of the user interface system will be described with reference to FIG. 7. FIG. 7 is a sequence diagram illustrating a processing procedure of the user interface system according to the embodiment of the present disclosure.

As illustrated in FIG. 7, the terminal device 10 presents information for receiving, from the user, designation related to a target to be subjected to color conversion by image editing for converting the color of an image using instance tracking and pixel tracking (step S201). The terminal device 10 receives designation by the user (step S202). Then, the terminal device 10 transmits information indicating the designation by the user to the image editing device 100 (step S203).

The image editing device 100 performs image editing processing (step S204). The image editing device 100 performs image editing processing of converting a color of a target designated by the user.

Then, the image editing device 100 transmits the result of the image editing (step S205). Then, the terminal device 10 presents the acquired result of image editing received from the image editing device 100 (step S206).

1-6. Processing Example

Hereinafter, an example of various types of processing will be described with reference to FIGS. 8 to 13. Note that description of points similar to those in FIG. 1 will be omitted as appropriate. In the following flowchart, a case where the user interface system 1 performs processing will be described as an example, but the following processing may be performed by any device included in the user interface system 1, such as the image editing device 100 and the terminal device 10 included in the user interface system 1.

1-6-1. Use Example of Editing by User

Figure 8:
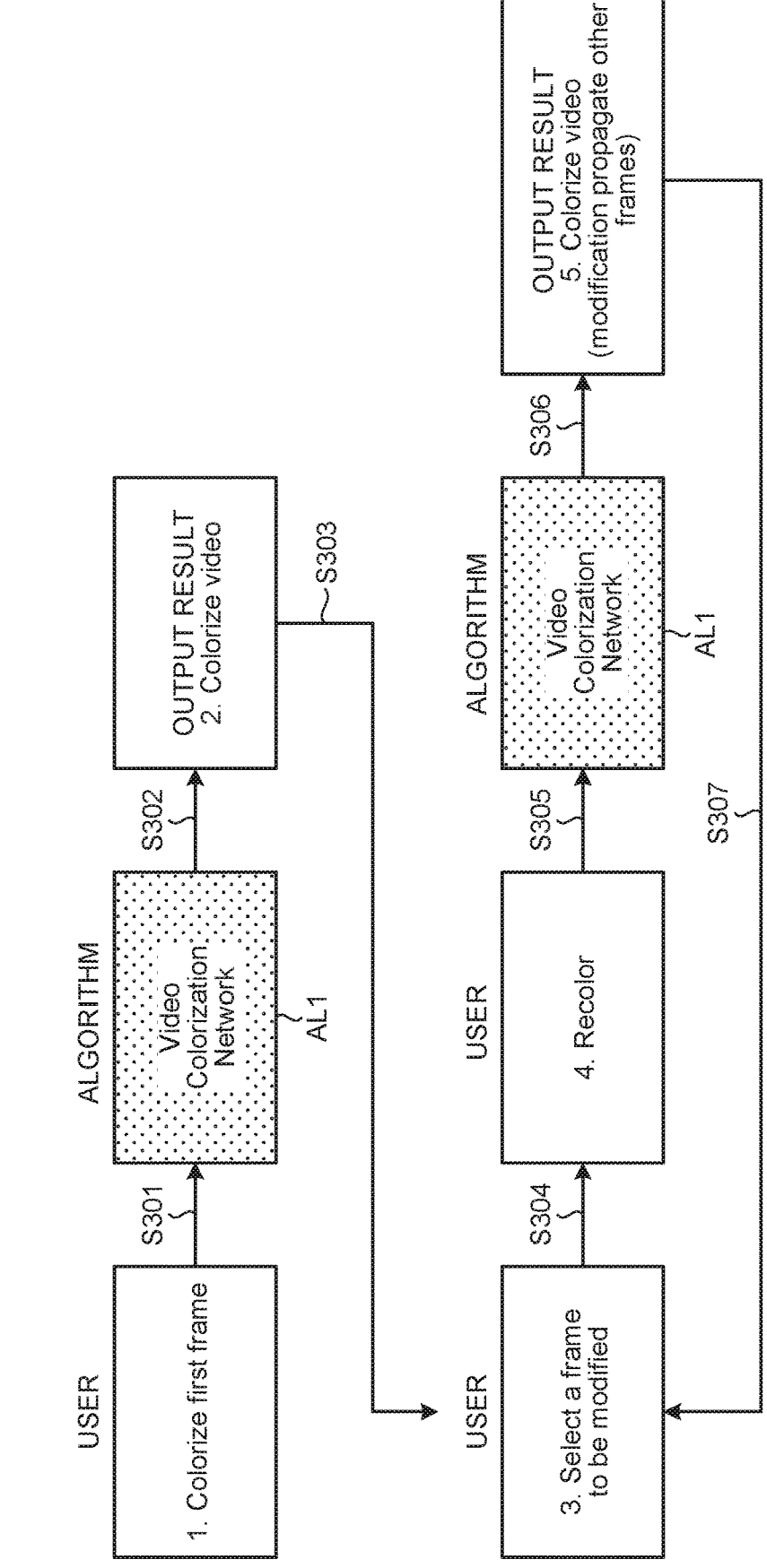
FIG. 8 is a diagram illustrating a processing example using editing by a user.

First, processing using editing by the user will be briefly described with reference to FIG. 8. FIG. 8 is a diagram illustrating a processing example using editing by the user. As illustrated in FIG. 8, the user colors the first frame (image) of the moving image, and the user interface system 1 performs processing by an algorithm AL1 on the moving image including the colored frame (step S301). The user interface system 1 performs the image editing processing of converting the color of the moving image using the first frame as a reference image. Note that the first frame is an example, and the frame to be colored by the user is not limited to the first frame and may be any frame.

The user interface system 1 acquires a moving image colored and processed by the algorithm AL1 as an output result (step S302). For example, the algorithm AL1 is a machine learning model (coloring model) such as a video chromatic network. The user interface system 1 inputs a moving image including a colored frame to the coloring model, and acquires the colored moving image as an output result.

The user interface system 1 presents the output result to the user (step S303), and selects a frame (image) to be corrected by the user. Then, the user corrects the color of the selected frame (step S304), and the user interface system 1 performs processing by the algorithm AL1 on the moving image including the frame corrected by the user (step S305). The user interface system 1 performs the image editing processing of converting the color of the moving image using the first frame and the frame selected by the user as reference images. That is, the user interface system 1 uses the plurality of frames of the first frame and the frame selected by the user as the reference images. As a result, the user interface system 1 can perform more appropriate color conversion.

The user interface system 1 acquires a moving image colored and processed by the algorithm AL1 as an output result (step S306). Then, the user interface system 1 presents the output result to the user (step S307), and repeats the processing from step S304. As a result, the user interface system 1 can make the color close to a color desired by the user.

Note that, as a method of coloring the image by the user, several method are conceivable, and for example, a method of completely manually coloring the image or a method of automatically coloring the image by an automatic coloring method may be used. In addition, the method of coloring the image by the user may be a semi-automatic coloring method (using photo shop elements or the like) in which the user gives a partial hint and the algorithm colors the image based on the hint.

1-6-2. Instance Tracking

Figure 9:
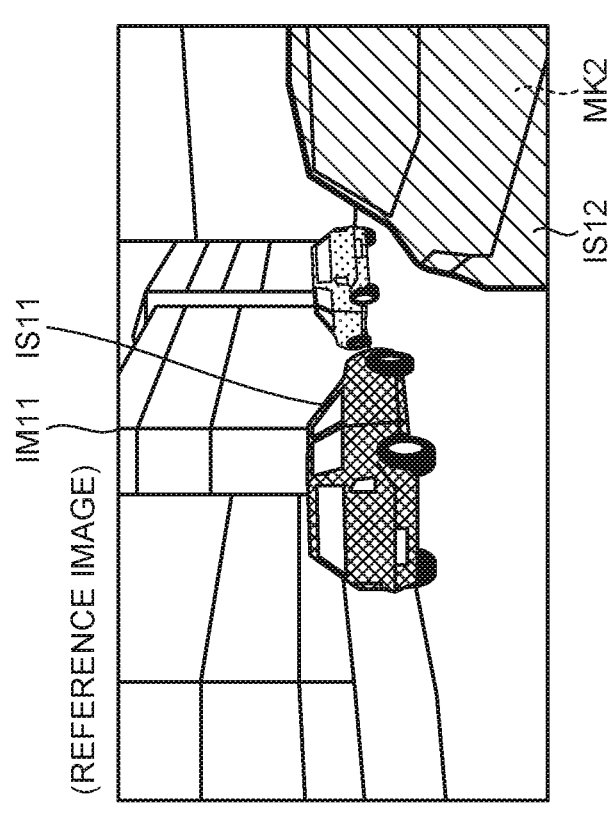
FIG. 9 is a diagram illustrating an outline of processing related to instance tracking.
Figure 10:
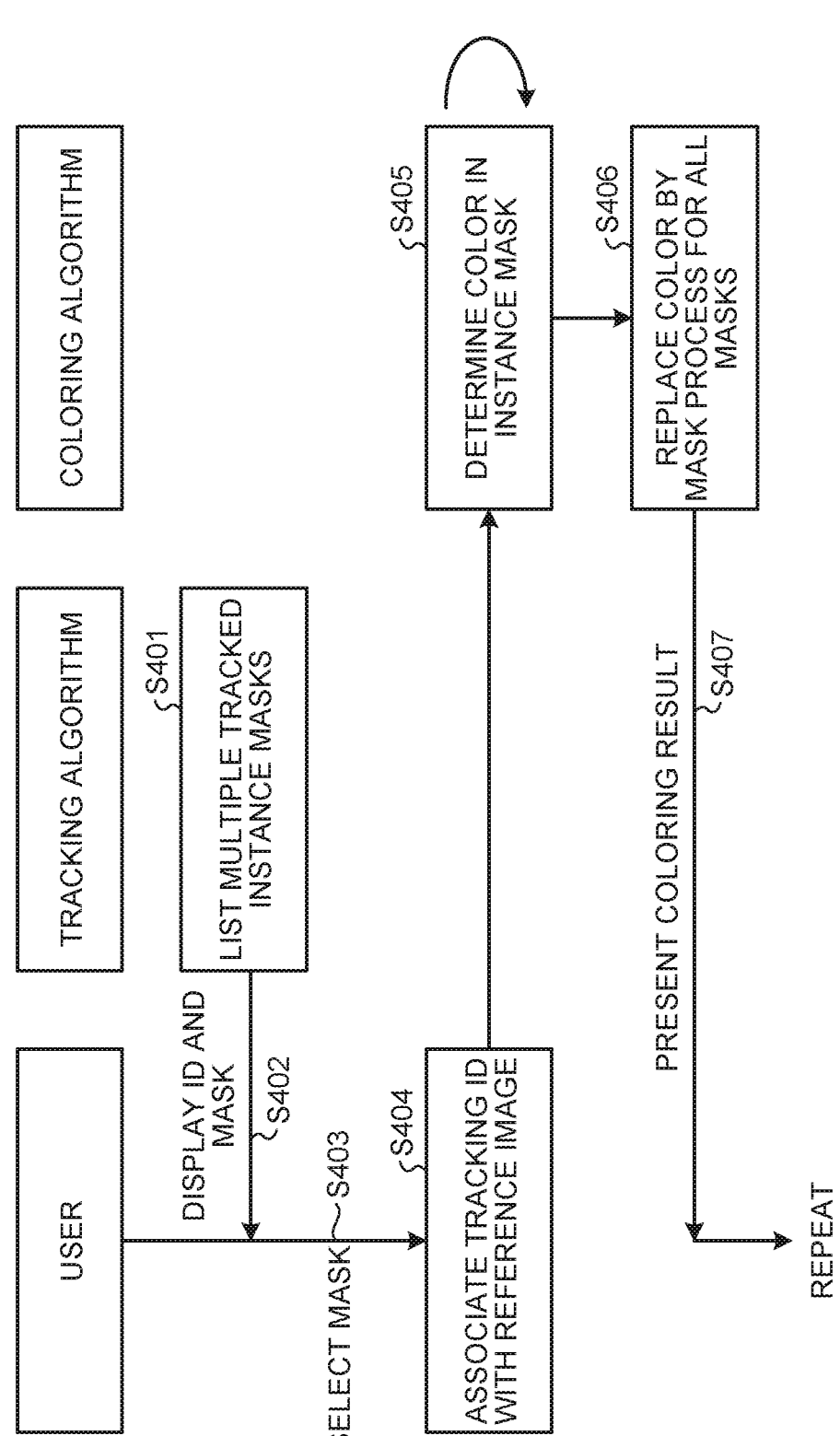
FIG. 10 is a diagram illustrating a processing example regarding instance tracking.

Next, an example of processing related to instance tracking will be described with reference to FIGS. 9 and 10. FIG. 9 is a diagram illustrating an outline of processing related to instance tracking. FIG. 10 is a diagram illustrating a processing example related to instance tracking.

The user interface system 1 performs image editing of coloring a moving image to be colored including an instance identified by instance tracking using a reference image. In FIG. 9, the user interface system 1 performs image editing on a moving image IM12 as a moving image to be colored. The user interface system 1 performs image editing on the moving image IM12 including an instance IS13, which is an object (car), as a moving image to be colored, and changes the color of the instance IS13.

Note that a method related to instance tracking is disclosed in, for example, the following document and the like. Detailed description of the instance tracking will be omitted as appropriate.

Instance-aware Image Colorization, Jheng-Wei Su, Hung-Kuo Chu, Jia-Bin Huang <https://arxiv.org/pdf/2005.10825.pdf>

In FIG. 9, the user interface system 1 uses an image IM11 that is a color image as a reference image. The image IM11 includes two objects (cars) of an instance IS11 and an instance IS12 which are cars. Therefore, the user interface system 1 designates which one of the instance IS11 and the instance IS12, in the image IM11, that are the reference images is used for changing the color of the instance IS13.

In FIG. 9, the user interface system 1 designates to use the instance IS11 for changing the color of the instance IS13, associates the instance IS11 with the instance IS13, and excludes the instance IS12. For example, the user interface system 1 excludes the instance IS12 by adding a mask MK12 for exclusion to the instance IS12. As described above, the user interface system 1 may perform association at a finer (instance/pixel) level by introducing an exclusion mask that limits a region to a region that is candidate for association. Note that the association may be performed not according to the image level but according to the feature amount level, and the association may be performed by calculating the similarity by the feature vector output from the neural network (model).

Here, the processing example regarding the instance tracking illustrated in FIG. 10 will be described. First, the user interface system 1 lists a plurality of tracked instance masks by the tracking algorithm (step S401), and displays the IDs (tracking IDs) and the masks (step S402). For example, the user interface system 1 presents a mask associated with the instance identified by the tracking algorithm and an ID for identifying the instance to the user. For example, the user interface system 1 tracks an object by a tracking algorithm and presents a plurality of candidates (instances).

Then, the user selects a mask (step S403), and associates the tracking ID with the reference image (step S404). The user interface system 1 receives, from the user, selection of the mask and the association of the tracking ID with the reference image according to the operation of the user.

The user interface system 1 determines the color in the instance mask by the coloring algorithm (step S405). The user interface system 1 determines the color in the instance mask for all the objects associated by the user. Then, the user interface system 1 performs color replacement (change) by mask processing on all the masks by the coloring algorithm (step S406). As a result, the user interface system 1 acquires the moving image subjected to color conversion as a coloring result.

The user interface system 1 presents the coloring result (step S407). For example, the user interface system 1 presents the moving image subjected to color conversion to the user as a coloring result, and repeats the processing. For example, when the user makes a correction to the presented coloring result, the user interface system 1 performs coloring again using the information about the correction made by the user.

1-6-3. Pixel Tracking (Dense Tracking)

Figure 11:
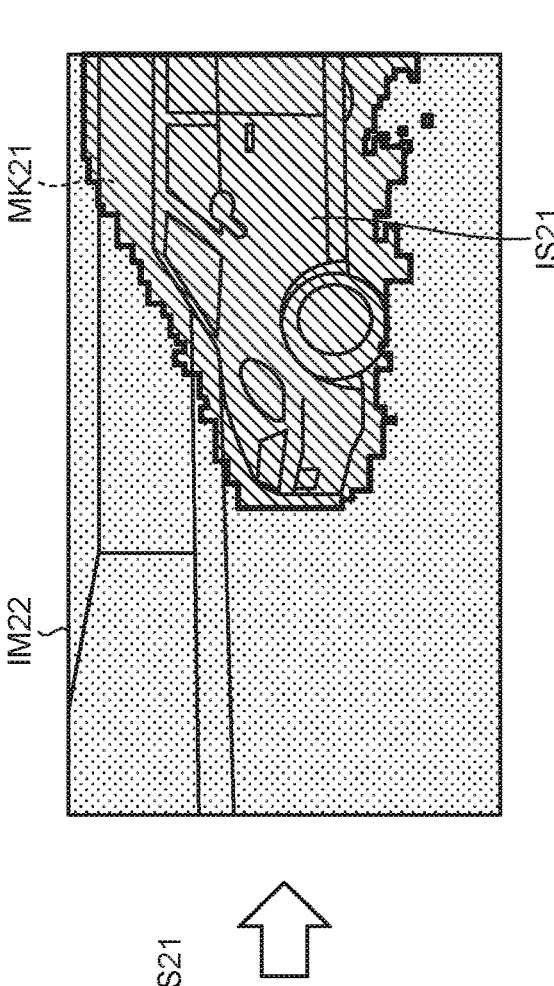
FIG. 11 is a diagram illustrating an outline of processing related to pixel tracking.
Figure 12:
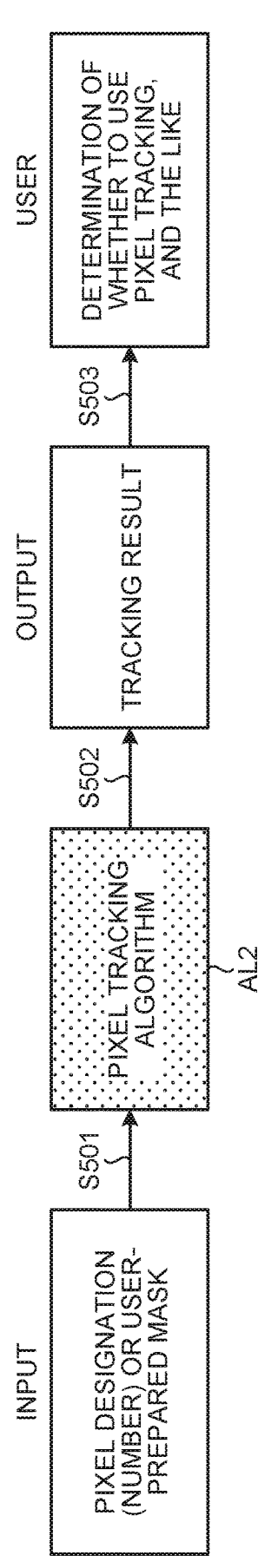
FIG. 12 is a diagram illustrating a processing example related to pixel tracking.

Next, an example of processing related to pixel tracking will be described with reference to FIGS. 11 and 12. FIG. 11 is a diagram illustrating an outline of processing related to pixel tracking. FIG. 12 is a diagram illustrating a processing example related to pixel tracking.

The user interface system 1 performs image editing for coloring a moving image to be colored including pixels in a range determined by pixel tracking using a reference image. In FIG. 11, the user interface system 1 performs image editing on a moving image including an image IM21, an image IM22, and the like as a moving image to be colored. The user interface system 1 performs image editing on a moving image including an instance IS21 that is an object (car) as a moving image to be colored, and changes the color of the instance IS21. FIG. 11 illustrates an example in which a plurality of pixel numbers is designated. The user interface system 1 receives designation of a pixel to be tracked by designation (numbers) of the pixels by the user. Note that the user interface system 1 may use a mask input by the user. In this case, the user interface system 1 may determine pixels in a range associated with the mask input by the user as the target to be tracked.

For example, the user designates pixels in a range including the instance IS21 that is a car in the image IM21 as a tracking target. Then, the user interface system 1 receives selection of a range of the image IM21 by the user. In FIG. 11, it receives selection of pixels in a range associated with a mask MK21 in the image IM21. The user interface system 1 tracks pixels in a range associated with the mask MK21 for a moving image including the image IM21, the image IM22, and the like by pixel tracking. In FIG. 11, the user interface system 1 determines pixels in a range associated with the mask MK21 in the image IM22 by pixel tracking.

The user interface system 1 can improve the quality of coloring of an object that is not recognized as an instance by using pixel tracking. Further, when inputting a mask, the user interface system 1 may designate (surround) the entire vehicle as in the mask MK1 in FIG. 1, or may designate part of the vehicle.

For example, the user may designate to perform pixel tracking when the user is not satisfied with the coloring result when pixel tracking is not used, and verifying whether only the car portion can be improved. In this case, the user interface system 1 may receive designation of pixels or a mask prepared by the user, and perform pixel tracking based on the information. For example, when the user inputs a mask, the user interface system 1 may automatically track the mask and warp the color using the mask to present the coloring result.

Note that a technique related to pixel tracking (dense tracking) is disclosed in, for example, the following document and the like. Detailed description of pixel tracking will be omitted as appropriate.

Tracking Emerges by Colorizing Videos, Carl Vondrick, Abhinav Shrivastava, Alireza Fathi, Sergio Guadar-rama, Kevin Murphy <https://arxiv.org/pdf/1806.09594.pdf>

Hereinafter, the processing example related to pixel tracking illustrated in FIG. 12 will be described. First, the user interface system 1 receives an input from a user. For example, the user interface system 1 presents an image to be designated (for example, one image included in a moving image), and receives an input by the user to the presented image. The user interface system 1 receives pixel designation (number) or a mask prepared by the user.

Then, the user interface system 1 performs processing by a pixel tracking algorithm AL2 (step S501). The user interface system 1 performs pixel tracking process on a moving image including an image designated by the user. The user interface system 1 acquires a moving image tracked and processed by the algorithm AL2 as a tracking result (step S502).

The user interface system 1 presents the tracking result to the user (step S503), and determines whether the user who has confirmed the tracking result uses pixel tracking. As a result, the user interface system 1 can switch whether to use the pixel tracking according to the determination by the user according to the accuracy of the result of the pixel tracking.

1-6-4. Image Editing Processing Example

Figure 13:
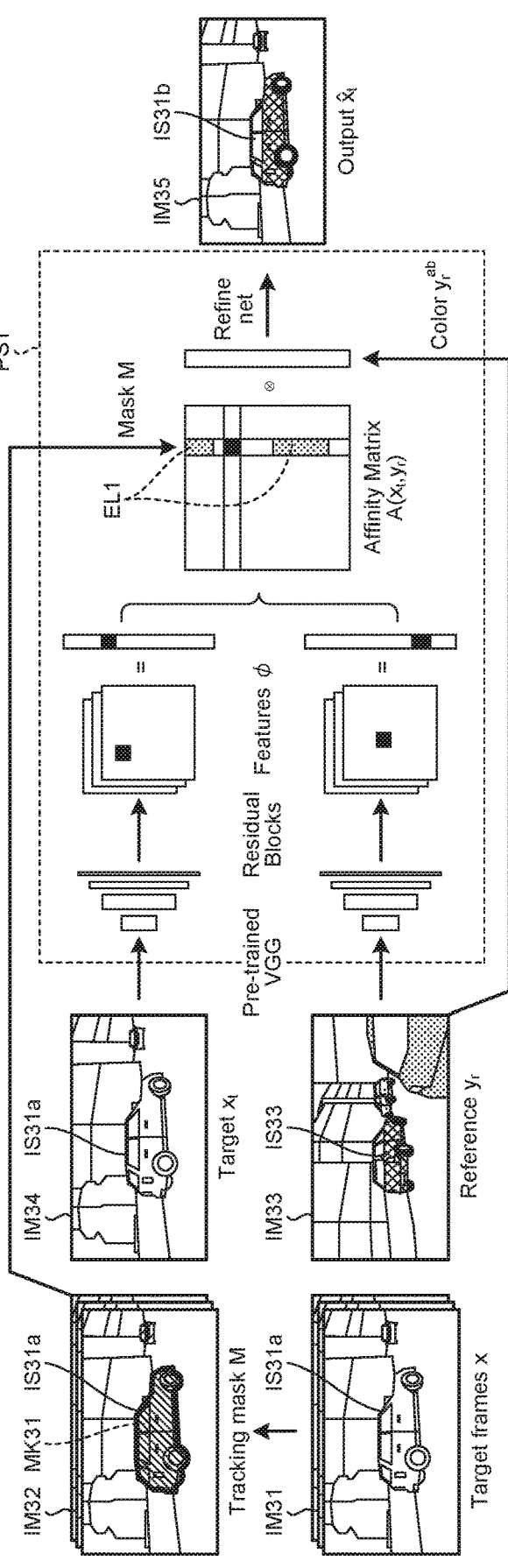
FIG. 13 is a diagram illustrating an example of image editing processing by the user interface system.

An outline of the image editing processing by the user interface system 1 will be described below. FIG. 13 is a diagram illustrating an example of image editing processing by the user interface system. Note that description of the same points as those described above will be omitted as appropriate.

FIG. 13 illustrates, as an example, a case where the user interface system 1 performs image editing on a moving image IM31 including an instance IS31a that is an object (car) as a moving image to be colored. Note that, as in the instance IS31a, an instance IS31b, and the like, description will be made in a distinguishable manner by adding alpha-betic characters such as "a" and "b" at the end, but these are assumed to be instances associated with the same object (car) (collectively referred to as an "instance IS31"). For example, FIG. 13 illustrates a case where the instance IS31 that is a car is a color conversion target.

A moving image IM32 of FIG. 13 illustrates a state in which a mask MK31 is attached to the instance IS31a by tracking. For example, the user interface system 1 indicates a state in which the mask MK31 is attached to the instance IS31a by instance tracking or pixel tracking.

In FIG. 13, the user interface system 1 uses, as the reference image, an image IM33 that is a color image including an instance IS32 that is a car. Note that the user interface system 1 may designate the instance IS32 as a target whose color is referred. For example, the user inter-face system 1 may exclude a car partially included at the right end in the image IM33 by the processing illustrated in FIG. 9 and designate the instance IS32 as a target whose color is referred.

The user interface system 1 uses the image IM33 as a reference image and performs color conversion processing (coloring processing) on each frame (image) of the moving image IM31. Although only an image IM31 of the frame at time point t in a moving image IM34 is illustrated in FIG. 13, the user interface system 1 performs color conversion processing (coloring processing) on all frames of the moving image IM31. For example, as illustrated in a process PS1, the user interface system 1 extracts features of the image IM33 and the image IM34 using a model or the like generated by machine learning such as deep learning.

Then, the user interface system 1 compares the features of the image IM33 with the features of the image IM34 to generate a matrix (for example, Affinity Matrix in FIG. 13). The user interface system 1 performs masking using the mask MK31 of the moving image IM32 to set only a partial region to be extracted. FIG. 13 illustrates a case where an element EL1 in the Affinity Matrix is a region associated with the mask "Mask M", and the element EL1 is set to be extracted. For example, the user interface system 1 extracts a region having high similarity in the element EL1. Then, the user interface system 1 warps the color of the instance IS32 in the image IM33 of the reference image for the extracted region, thereby performing color conversion processing (coloring processing) of the image IM34. In FIG. 13, the user interface system 1 generates an image IM35 including the instance IS31b that is a colored object (car). As a result, the user interface system 1 generates a moving image in which the color of the instance IS31 is converted.

As described above, the user interface system 1 performs the image editing processing. For example, the user interface system 1 propagates a mask to represent correspondence on a time axis instead of a color, and determines the color in a region limited by the mask of the reference frame (reference image). For example, the processing performed by the user interface system 1 may include three phases of tracking, warping, and refine. For example, tracking is performed to obtain temporal correspondence between a reference frame and a target frame (target image).

For example, the user interface system 1 may designate which color is warped more accurately by designating a region in the reference frame that is temporally correlated with pixels to be color in the target frame. For example, the user interface system 1 acquires semantic features by feed-ing (inputting) a reference frame and a target frame to a network (model) for a color to be warped, and calculates a spatial correspondence based on similarity therebetween.

For example, the user interface system 1 can warp the color based on the spatiotemporal correspondence by warp-ing the color only from the region designated by the track-ing. Unlike a propagation-based model in which subsequent frames may be colored with the wrong color due to the accumulation of prediction errors across the frames, the user interface system 1 may perform coloring with the vibrant color designated by the reference frame via a propagation mask rather than color. Further, in the refinement, the user interface system 1 can correct (recover) color distortion and the like by using the encoder decoder network, and enhance temporal coherence of the adjacent entire frame.

In addition, the user interface system 1 uses two types of tracking of instance tracking and pixel tracking (dense tracking) as a method of acquiring the correspondence on the time axis. As a result, the user interface system 1 can limit the region where the color is distorted. The user interface system 1 uses instance tracking to prevent colors of individual objects from being blended incorrectly. The user interface system 1 can accurately distinguish instances by using instance tracking.

On the other hand, it may be difficult to track an object of an undefined class or track an object with a granularity smaller than an instance only by instance tracking. Therefore, the user interface system 1 uses pixel tracking that perform tracking at the pixel level. The user interface system 1 can avoid the problem of color blur due to distortion of the color of the entire frame by designating the temporally correlated region for each pixel.

1-7. Model and Learning Processing

Figure 14:
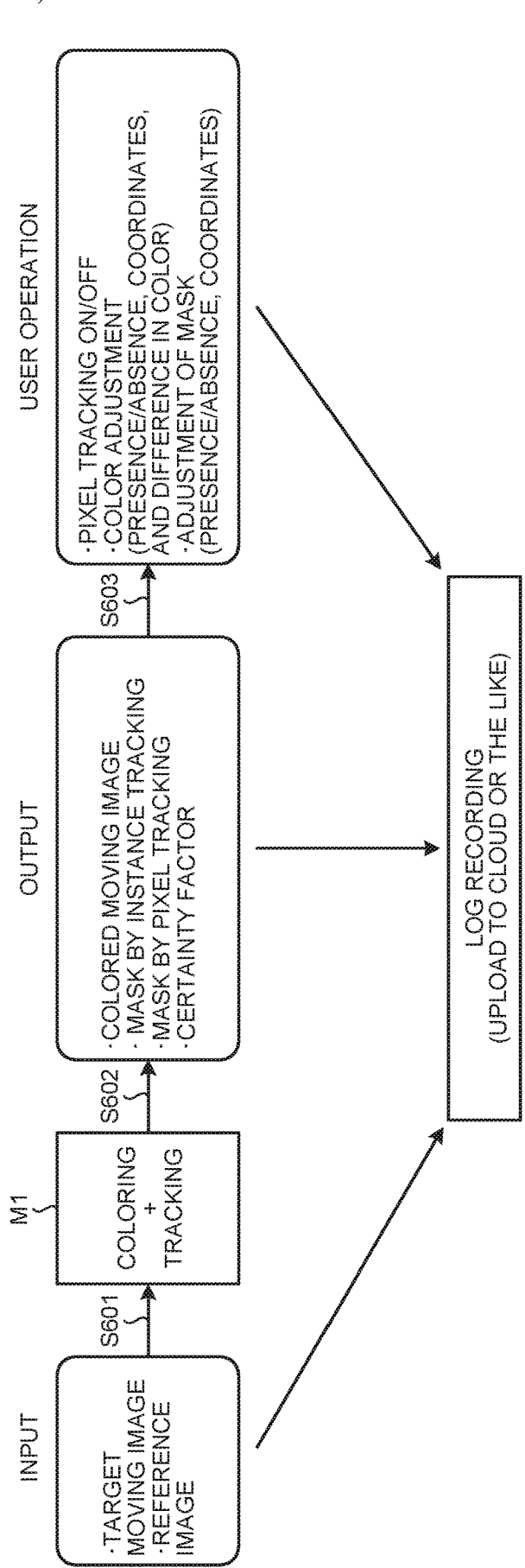
FIG. 14 is a diagram illustrating an example of a machine learning model used in the user interface system.

An outline of a machine learning model (model) and learning processing in the user interface system 1 will be described below with reference to FIGS. 14 to 16. FIGS. 14 to 16 are diagrams illustrating an example of a machine learning model used in the user interface system.

1-7-1. First Model (Coloring+Tracking)

First, a first model for performing tracking and coloring will be described with reference to FIG. 14. For example, FIG. 14 illustrates an example of the first model for performing tracking and coloring. A model M1 illustrated in FIG. 14 is the first model that performs tracking and coloring. Although FIG. 14 illustrates one model for simplification of illustration, the model M1 may include a first portion model that performs tracking and a second portion model that performs coloring.

The user interface system 1 inputs the target moving image and the reference image to the model M1 (step S601), and causes the model M1 to output the colored moving image, the mask by the instance tracking, the mask by the pixel tracking, and the certainty factor (step S602).

For example, the user interface system 1 inputs the target moving image and the reference image to the first portion model that performs tracking, and causes the first portion model to output a mask by instance tracking or a mask by pixel tracking. Note that the first portion model may output the certainty factor related to the mask.

For example, the user interface system 1 inputs the mask, the target moving image, and the reference image output by the first portion model to the second portion model, and causes the second portion model to output the colored moving image and the certainty factor related to coloring. When the first portion model does not output the certainty factor related to the mask, the user interface system 1 sets the certainty factor output by the second portion model as the certainty factor of the output of the model M1.

When the first portion model outputs the certainty factor related to the mask, the user interface system 1 may calculate the certainty factor based on the certainty factor related to the mask and the certainty factor related to the coloring. For example, the user interface system 1 may use the average of the certainty factor related to the mask and the certainty factor related to the coloring as the certainty factor of the output of the model M1.

The user interface system 1 presents the colored moving image, the mask, and the certainty factor to the user (step S603). Then, the user who has confirmed the presented information performs an operation related to the presented information. For example, the user performs designation of whether to use pixel tracking, color adjustment, mask adjustment, and the like. The user interface system 1 receives the user's color adjustment, mask adjustment, and the like as the user's correction to the image editing result. For example, since a region in which color adjustment and mask adjustment have been performed by the user indicates a region/degree to which the coloring algorithm did not function well, the user interface system 1 may use the information as correct answer data.

The user interface system 1 collects, as a log, information input to the model M1 (also referred to as "input information"), information output by the model M1 (also referred to as "output information"), and information about correction by the user to the output information by the model M1, and the like in association with each other. For example, the log may be uploaded to a cloud or the like. The user interface system 1 uses the log as learning data. The user interface system 1 may update the model M1 using information corrected by the user as correct information. For example, when input information included in the log is input to the model M1, the user interface system 1 updates the model M1 so that information corrected by the user is output.

The user interface system 1 may store each log in association with correct information about the certainty factor. For example, the user interface system 1 associates correct information indicating a low certainty factor (for example, 0 or the like) with the log corrected by the user. For example, the user interface system 1 associates correct information indicating a high certainty factor (for example, 1 or the like) with a log that the user has not corrected. When the input information included in each log is input to the model M1, the user interface system 1 updates the model M1 so that the certainty factor indicated by the correct information associated with the log is output.

For example, the user interface system 1 may learn (update) the model M1 by performing the process such as an error back propagation method so as to minimize a predetermined loss function. As a result, the user interface system 1 can perform learning processing of learning the parameters of the model M1. Note that the above is merely an example, and the user interface system 1 may learn the model by any processing as long as the model can be learned.

1-7-2. Second Model (Discriminator)

Next, a second model that functions as a discriminator will be described with reference to FIG. 15. For example, FIG. 15 illustrates an example of the second model used for estimation of the probability of which the user performs adjustment. A model M2 illustrated in FIG. 15 is the second model that outputs a certainty factor as information used for estimation of a probability of which the user performs adjustment.

The user interface system 1 inputs the moving image to be colored, the reference image, the moving image of the coloring result, the mask by the instance tracking, and the mask by the pixel tracking to the model M2 (step S701), and causes the model M2 to output the certainty factor of the color/tracking mask (step S702). For example, the certainty factor output by the model M2 is used for estimating the probability of which the user performs adjustment.

The user interface system 1 may update the model M2 using the output of the model M2 and the log adjusted (corrected) by the user. For example, the user interface system 1 updates the model M2 using a loss between the output of the model M2 and the log adjusted (corrected) by the user. For example, the user interface system 1 updates the model M2 by processing similar to that of the model M1.

Note that the user interface system 1 may use the model M2 for various purposes. For example, the user interface system 1 uses the model M2 for estimation of the certainty factor for the output, that is, estimation of the probability of which the user performs adjustment. In addition, the user interface system 1 may use the model M2 for suggesting a region requiring adjustment by the user. In a case where the certainty factor is equal to or less than a predetermined threshold value, the user interface system 1 may present a region colored by image editing to the user as a region requiring adjustment by the user. In addition, the user interface system 1 may use the model M2 for automatic switching of availability (ON/OFF) of pixel tracking.

1-7-3. Third Model (Refiner)

Next, a third model that functions as a refiner will be described with reference to FIG. 16. For example, FIG. 16 illustrates an example of the third model used for refining the tracking mask. A model M3 illustrated in FIG. 16 is a third model used for refining the tracking mask. The model M3 outputs a refined tracking mask.

The user interface system 1 inputs the moving image to be colored, the reference image, the moving image of the coloring result, the mask by instance tracking, and the mask by pixel tracking to the model M3 (step S801), and causing the model M3 to output a refined and more accurate tracking mask (step S802).

The user interface system 1 may update the model M3 using the output of the model M3 and the mask adjusted (corrected) by the user. For example, the user interface system 1 updates the model M3 using a loss between the output of the model M3 and the mask adjusted (corrected) by the user. For example, the user interface system 1 updates the model M3 by processing similar to that of the model M1.

Note that the user interface system 1 may use the model M3 for various purposes. For example, the user interface system 1 uses the model M3 to improve the accuracy of the tracking mask.

1-8. Color Conversion of Color Image

In the above-described example, coloring of a monochrome (black-and-white) moving image (video) is described as an example of image editing. However, image editing may be color conversion of a color image. The user interface system 1 can color not only a black-and-white moving image but also an already-colored moving image. For example, the user interface system 1 may change the color of some regions. For example, the user interface system 1 may perform grading.

For example, the user interface system 1 may convert the color of the color moving image by converting the color moving image into gray scale and then performing image editing using any moving image. As described above, the user interface system 1 can perform image editing by performing processing similar to the processing described above by regarding the color of the moving image (color moving image) that has already been colored as gray scale.

2. Other Embodiments

The processing according to each of the above-described embodiments may be performed in various different forms (modifications) other than the above-described embodiments and modifications.

2-1. Other Configuration Examples

In the above example, the case where the image editing device 100 and the terminal device 10 are separate bodies is described, but these devices may be integrated. That is, a device (the image editing device 100 or the like) that performs the image editing processing and a device (the terminal device 10 or the like) that receives an operation such as designation of a target by the user may be integrated.

In this case, the user interface system 1 may include the terminal device 10 that functions as an information processing device that presents information to the user, receives an operation such as designation of a target by the user, and performs the image editing processing, and an information providing device (server device) that provides various types of information to the terminal device 10.

Note that the above-described configuration is an example, and the user interface system 1 may have any device configuration as long as it can present information to the user and perform the image editing processing.

2-2. Others

Further, it is also possible to manually perform all or part of the processing described as being performed automatically in the processing described in the above embodiment, or alternatively, it is also possible to automatically perform all or part of the processing described as being performed manually by a known method. In addition, the processing procedure, specific name, and information including various pieces of data and parameters illustrated in the above document and drawings can be arbitrarily changed unless otherwise specified. For example, the various types of information illustrated in each figure are not limited to the illustrated information.

Further, each component of each of the illustrated devices is a functional concept, and does not necessarily have to be physically configured as illustrated in the figure. That is, the specific form of distribution/integration of each device is not limited to the one illustrated in the figure, and all or part of the device can be functionally or physically distributed/integrated in any unit according to various loads and usage conditions.

Further, the above-described embodiments and modifications can be appropriately combined in a range where the processing contents do not contradict each other.

Further, the effects described in the present specification are merely examples and are not limiting, and other effects may be present.

3. Effects According to Present Disclosure

As described above, the user interface system (for example, in the embodiment, the user interface system 1) according to the present disclosure includes a presentation means (the presentation unit 152 or the like in the embodiment) and an acceptance means (the acceptance unit 153 in the embodiment). The presentation means presents information for receiving, from the user, designation related to a target to be subjected to color conversion by image editing for converting a color of an image using instance tracking and pixel tracking. The acceptance means receives designation by the user.

As described above, the user interface system according to the present disclosure can appropriately provide a service related to image editing of color conversion by presenting information for receiving, from the user, designation related to a target to be subjected to color conversion and receiving designation by the user.

Furthermore, the presentation means presents information for receiving, from the user, designation related to a target to be subjected to color conversion by image editing using a model learned by machine learning. As described above, the user interface system can appropriately provide a service related to image editing of color conversion by presenting information for receiving, from the user, designation in the image editing using the model learned by the machine learning and receiving designation by the user.

In addition, the presentation means presents information for receiving designation related to a target to be subjected to color conversion by image editing that is coloring of a black-and-white image or color conversion of a color image. As described above, the user interface system can appropriately provide a service related to image editing of color conversion by presenting information for receiving, from the user, designation related to the target to be subjected to coloring of the black-and-white image or color conversion of the color image and receiving the designation by the user.

The acceptance means receives a reference image used in image editing from the user. As described above, the user interface system can appropriately provide a service related to image editing of color conversion by receiving the reference image used in the image editing from the user.

Furthermore, the presentation means presents information for receiving, from the user, selection of an instance as designation. The acceptance means receives selection of an instance by the user. As described above, the user interface system can realize the color conversion for the instance, and can appropriately provide a service related to image editing of color conversion by presenting information for receiving selection of the instance and receiving selection of the instance by the user.

In addition, the acceptance means receives selection of identification information for identifying an instance. As described above, the user interface system can appropriately provide a service related to image editing of color conversion by receiving selection of the identification information for identifying the instance.

In addition, the acceptance means receives selection of a tracking ID that is identification information assigned to an instance tracked by instance tracking. As described above, the user interface system can appropriately provide a service related to image editing of color conversion by receiving selection of the tracking ID that is the identification information assigned to the instance tracked by the instance tracking.

In addition, the acceptance means receives selection of an instance using a list indicating each of the plurality of instances. As described above, the user interface system can appropriately provide a service related to image editing of color conversion by receiving selection of the instance using the list indicating each of the plurality of instances in the list.

In addition, the acceptance means receives selection of a reference image to be used in color conversion for an instance. As described above, the user interface system can appropriately provide a service related to image editing of color conversion by receiving selection of the reference image used in the color conversion for the instance.

The acceptance means receives a reference image to be used in image editing for each instance selected by the user. As described above, the user interface system can realize appropriate color conversion for each instance by receiving selection of the reference image for each instance, and can appropriately provide a service related to image editing of color conversion.

Furthermore, the presentation means presents one image as designation from the user. The acceptance means receives selection of a pixel for one image by the user. As described above, the user interface system can realize color conversion based on the designated pixel, and can appropriately provide a service related to image editing of color conversion by presenting one image and receiving selection of the pixel for the one image by the user.

Further, the acceptance means receives selection of a range of one image by the user. As described above, the user interface system can realize the color conversion based on the designated range and can appropriately provide a service related to image editing of color conversion by receiving selection of the range of one image by the user.

The presentation means presents a result of color conversion by image editing. As described above, the user interface system presents the result of the color conversion by the image editing, so that the user can confirm the result of the image editing, and the system can appropriately provide a service related to image editing of color conversion.

The presentation means presents the image after the color conversion as a result of the image editing. As described above, the user interface system presents the image after the color conversion, so that the user can confirm the result of the color conversion, and the system can appropriately provide a service related to image editing of color conversion.

In addition, the acceptance means receives the user's correction of the image editing result. As described above, the user interface system can appropriately reflect the correction made by the user by receiving the correction made by the user to the result of the image editing, and can appropriately provide a service related to image editing of color conversion.

In addition, the acceptance means receives the user's correction of the image editing result. As described above, the user interface system can appropriately reflect the correction made by the user by receiving the correction made by the user to the result of the image editing, and can appropriately provide a service related to image editing of color conversion.

In addition, the user interface system includes a learning means (the learning unit 133 in the embodiment) that learns the model by machine learning using information about correction by the user. As described above, the user interface system can use the model reflecting the correction by the user by learning the model by the machine learning using the information about the correction by the user, and can appropriately provide a service related to image editing of color conversion.

Furthermore, the presentation means presents information indicating a certainty factor related to color conversion by image editing. As described above, the user interface system presents the information indicating the certainty factor related to the color conversion by the image editing, so that the user can confirm the certainty factor of the image editing, and the system can appropriately provide a service related to image editing of color conversion.

Furthermore, the presentation means presents information that proposes adjustment by the user based on the certainty factor. As described above, the user interface system can propose the adjustment to the user by presenting the information suggesting the adjustment by the user based on the certainty factor, and can appropriately provide a service related to image editing of color conversion.

Furthermore, the image editing device (for example, in the embodiment, the image editing device 100) according to the present disclosure includes an acquisition unit (the acquisition unit 131 in the embodiment) and an image editing unit (the image editing unit 132 in the embodiment). The acquisition unit acquires designation information indicating designation related to a target to be subjected to color conversion by image editing for converting a color of an image using instance tracking and pixel tracking. The image editing unit performs image editing to perform color conversion on the target indicated by the designation information acquired by the acquisition unit.

4. Hardware Configuration

Figure 17:
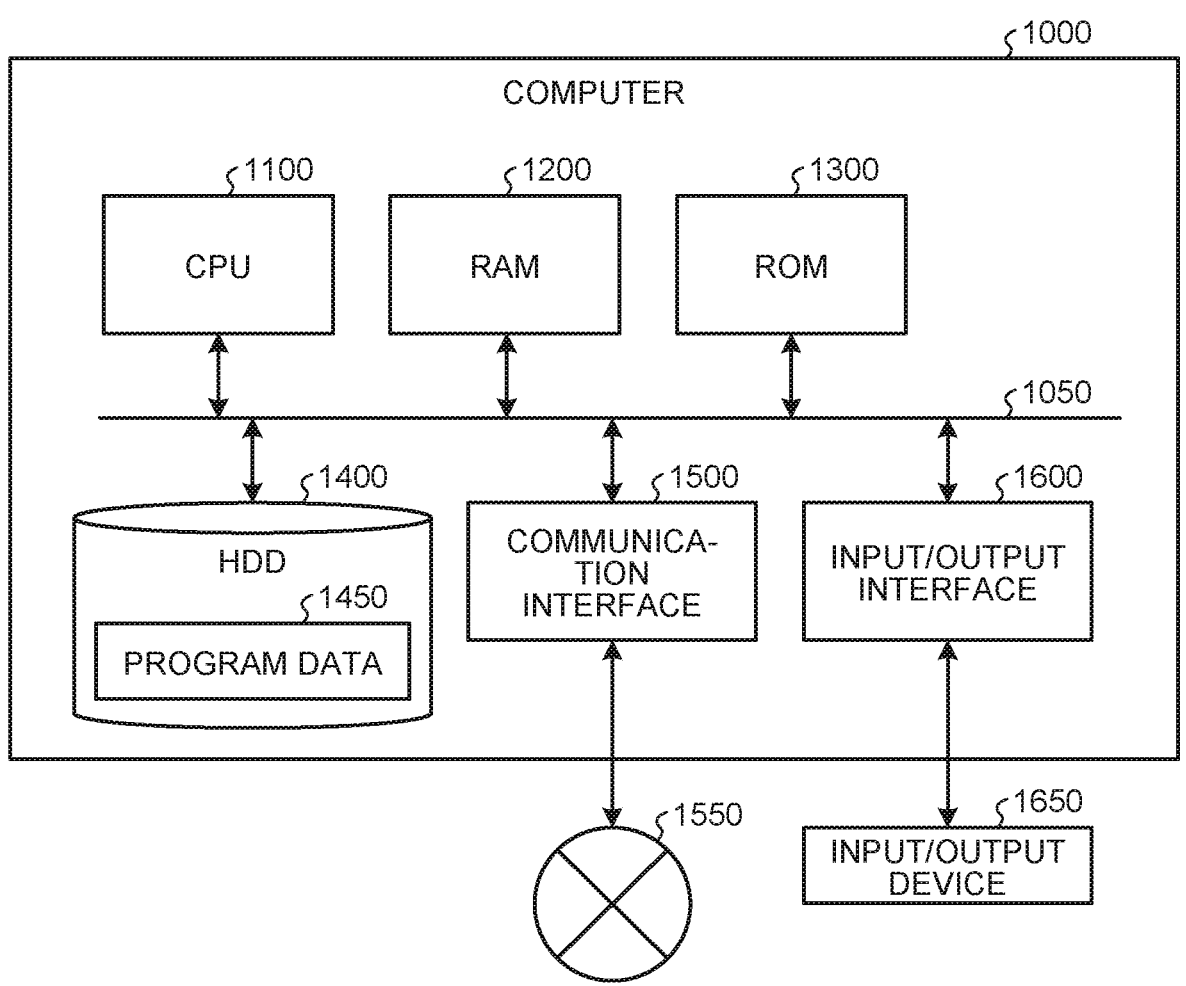
FIG. 17 is a hardware configuration diagram illustrating an example of a computer that implements functions of an information processing device.

The information processing device (information device) such as the image editing device 100 and the terminal device 10, which are the information processing devices according to the above-described embodiments, is realized by a computer 1000 having a configuration as illustrated in FIG. 17, for example. FIG. 17 is a hardware configuration diagram illustrating an example of the computer 1000 that implements the functions of the information processing device. Hereinafter, the image editing device 100 according to the embodiment will be described as an example. The computer 1000 includes a CPU 1100, a RAM 1200, a read only memory (ROM) 1300, a hard disk drive (HDD) 1400, a communication interface 1500, and an input/output interface 1600. Respective units of the computer 1000 are connected by a bus 1050.

The CPU 1100 operates based on a program stored in the ROM 1300 or the HDD 1400, and controls each unit. For example, the CPU 1100 develops a program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records programs executed by the CPU 1100, data used by the programs, and the like. Specifically, the HDD 1400 is a recording medium that records an information processing program according to the present disclosure which is an example of program data 1450.

The communication interface 1500 is an interface for the computer 1000 to be connected to an external network 1550 (for example, the Internet). For example, the CPU 1100 receives data from another device or transmits data generated by the CPU 1100 to another device via the communication interface 1500.

The input/output interface 1600 is an interface that connects an input/output device 1650 and the computer 1000. For example, the CPU 1100 receives data from an input device such as a keyboard and a mouse via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the image editing device 100 according to the embodiment, the CPU 1100 of the computer 1000 realizes the functions of the control unit 130 and the like by executing the information processing program loaded on the RAM 1200. In addition, the HDD 1400 stores the information processing program according to the present disclosure and data in the storage unit 120. The CPU 1100 reads the program data 1450 from the HDD 1400 and executes the program data, but as another example, the program may be acquired from another device via the external network 1550.

The present technology may also be configured as below.

(1)

A user interface system comprising:

a presentation means that presents information for receiving, from a user, designation related to a target to be subjected to color conversion by image editing for converting a color of an image using instance tracking and pixel tracking; and an acceptance means that receives the designation by the user.

(2)

The user interface system according to (1), wherein the presentation means presents information for receiving, from the user, the designation related to a target to be subjected to color conversion by the image editing using a model learned by machine learning.

(3)

The user interface system according to (1) or (2), wherein the presentation means presents information for receiving the designation related to a target to be subjected to color conversion by the image editing, the image editing being coloring of a black-and-white image or color conversion of a color image.

(4)

The user interface system according to any one of (1) to (3), wherein the acceptance means receives, from the user, a reference image to be used in the image editing.

(5)

The user interface system according to any one of (1) to (4), wherein the presentation means presents information for receiving selection of an instance as the designation from the user, and wherein the acceptance means receives the selection of the instance by the user.

(6)

The user interface system according to (5), wherein the acceptance means receives selection of identification information for identifying the instance.

(7)

The user interface system according to (6), wherein the acceptance means receives selection of a tracking ID that is the identification information assigned to the instance tracked by the instance tracking.

(8)

The user interface system according to any one of (5) to (7), wherein the acceptance means receives selection of the instance using a list indicating each of a plurality of instances.

(9)

The user interface system according to any one of (5) to (8), wherein the acceptance means receives selection of a reference image to be used in color conversion for the instance.

(10)

The user interface system according to (9), wherein the acceptance means receives a reference image to be used in the image editing for each instance selected by the user.

(11)

The user interface system according to any one of (1) to (10), wherein the presentation means presents one image, and wherein the acceptance means receives selection of a pixel for the one image by the user.

(12)

The user interface system according to (11), wherein the acceptance means receives selection of a range of the one image by the user.

(13)

The user interface system according to any one of (1) to (12), wherein the presentation means presents a result of color conversion by the image editing.

(14)

The user interface system according to (13), wherein the presentation means presents an image after color conversion as a result of the image editing.

(15)

The user interface system according to (13) or (14), wherein the acceptance means receives correction by the user for a result of the image editing.

(16)

The user interface system according to (14), further comprising:

a learning means that learns a model by machine learning using information about correction by the user.

(17)

The user interface system according to any one of (1) to (16), wherein the presentation means presents information indicating a certainty factor related to color conversion by the image editing.

(18)

The user interface system according to (17), wherein the presentation means presents information suggesting adjustment by the user based on the certainty factor.

(19)

A user interface method comprising:

presenting information for receiving, from a user, designation related to a target to be subjected to color conversion by image editing for converting a color of an image using instance tracking and pixel tracking; and receiving the designation by the user.

(20)

An image editing device comprising:

an acquisition unit that acquires designation information indicating designation related to a target to be subjected to color conversion by image editing for converting a color of an image using instance tracking and pixel tracking; and an image editing unit that performs the image editing for performing color conversion on a target indicated by the designation information acquired by the acquisition unit.

REFERENCE SIGNS LIST

1 USER INTERFACE SYSTEM
100 IMAGE EDITING DEVICE (INFORMATION PROCESSING DEVICE)
110 COMMUNICATION UNIT
120 STORAGE UNIT
121 LOG INFORMATION STORAGE UNIT
122 ALGORITHM INFORMATION STORAGE UNIT
123 PRE-CONVERSION INFORMATION STORAGE UNIT
124 POST-CONVERSION INFORMATION STORAGE UNIT
130 CONTROL UNIT
131 ACQUISITION UNIT
132 IMAGE EDITING UNIT
133 LEARNING UNIT
134 TRANSMISSION UNIT (PRESENTATION UNIT)
10 TERMINAL DEVICE (INFORMATION PROCESSING DEVICE)
11 COMMUNICATION UNIT
12 INPUT UNIT
13 DISPLAY UNIT
14 STORAGE UNIT
15 CONTROL UNIT
151 RECEPTION UNIT
152 PRESENTATION UNIT
153 ACCEPTANCE UNIT
154 TRANSMISSION UNIT
16 AUDIO OUTPUT UNIT

The invention claimed is:

1. An information processing system, comprising:

circuitry configured to:

provide first information related to a region in a first frame of a first video, wherein the region is a target of color conversion, the color conversion of the region is based on an instance tracking method and a pixel tracking method across a plurality of temporally successive frames of the first video, the color conversion of the region is propagated over time of the first video, and the plurality of temporally successive frames includes the first frame of the first video;

receive, based on a first user input and the first information, second information associated with a designation of the region; and control a screen to display:

the designation of the region; and a result of the color conversion of the region that corresponds to a second video, wherein a second frame from the displayed result is selected based on a second user input, and the selected second frame is corrected.

2. An information processing system, comprising:

circuitry configured to:

obtain information related to a target region in a first frame of a first video;

convert, based on the obtained information, color of the target region based on an instance tracking method and a pixel tracking method across a plurality of temporally successive frames of the first video, wherein the conversion of the color of the target region is propagated over time of the first video, and the plurality of temporally successive frames includes the first frame of the first video;

generate a result of the conversion of the color of the target region that corresponds to a second video;

control a screen to display the result of the conversion of the color of the target region;

select, based on a first user input, a second frame from the displayed result; and correct the selected second frame.

3. The information processing system according to claim 2, wherein the circuitry is further configured to convert the color of the target region based on a model learned by machine learning.

4. The information processing system according to claim 2, wherein the conversion of the color is for one of a black and white image, or a color image.

5. The information processing system according to claim 2, wherein the circuitry is further configured to receive a reference image for the conversion of the color of the target region.

6. The information processing system according to claim 2, wherein the information is for identification of the target region.

7. The information processing system according to claim 2, wherein the information corresponds to a tracking ID of the target region.

8. The information processing system according to claim 2, wherein the circuitry is further configured to receive a reference image for the conversion of the color of each target region of a plurality of target regions, and the plurality of target regions includes the target region.

9. The information processing system according to claim 2, wherein the circuitry is further configured to receive a pixel designation for an image.

10. The information processing system according to claim 9, wherein the circuitry is further configured to receive a range of the image.

11. The information processing system according to claim 2, wherein the circuitry is further configured to correct, based on a second user input, the selected second frame.

12. The information processing system according to claim 11, wherein the circuitry is further configured to learn, based on information of the correction, a model by machine learning.

13. The information processing system according to claim 2, wherein the circuitry is further configured to generate information indicating a certainty factor related to the conversion of the color of the target region.

14. The information processing system according to claim 13, wherein the generated information is for adjustment of the color, and the adjustment is based on a second user input.

15. An information processing system, comprising:

circuitry configured to:

obtain information related to a target region in a first frame of a first video;

perform object-level analysis to detect and track a specific object represented by the target region across a plurality of temporally successive frames of the first video;

perform pixel-level analysis to monitor changes in pixel values within the target region over a time period to maintain correspondence across the plurality of temporally successive frames, wherein the plurality of temporally successive frames includes the first frame of the first video;

identify and follow the target region across the plurality of temporally successive frames based on:

the obtained information, the object-level analysis, and the pixel-level analysis;

convert color of the target region based on the identification of the target region and the followed target region across the plurality of temporally successive frames, wherein the conversion of the color of the target region is propagated over time of the first video;

generate a result of the conversion of the color of the target region that corresponds to a second video;

control a screen to display the result of the conversion of the color of the target region;

select, based on a first user input, a second frame from the displayed result; and correct the selected second frame.

* * * * *